United States Patent
Bassi et al.

(10) Patent No.: US 11,750,108 B2
(45) Date of Patent: *Sep. 5, 2023

(54) METHOD FOR CONTROLLING OUTPUT VOLTAGE AT A MULTILEVEL INVERTER

(71) Applicant: King Abdulaziz University, Jeddah (SA)

(72) Inventors: Hussain Bassi, Jeddah (SA); Muhyaddin Rawa, Jeddah (SA)

(73) Assignee: King Abdulaziz University, Jeddah (SA)

( * ) Notice: Subject to any disclaimer, the term of this patent is extended or adjusted under 35 U.S.C. 154(b) by 408 days.

This patent is subject to a terminal disclaimer.

(21) Appl. No.: 17/121,144

(22) Filed: Dec. 14, 2020

(65) Prior Publication Data

US 2022/0069732 A1    Mar. 3, 2022

Related U.S. Application Data

(62) Division of application No. 17/010,897, filed on Sep. 3, 2020, now Pat. No. 10,917,021.

(51) Int. Cl.
*H02M 7/5387*    (2007.01)
*H02J 1/00*    (2006.01)
(Continued)

(52) U.S. Cl.
CPC .......... *H02M 7/483* (2013.01); *H02M 1/088* (2013.01); *H02M 7/537* (2013.01)

(58) Field of Classification Search
CPC ............... G08C 17/02; H02J 13/00004; H02J 13/00022; H02J 13/00024; H02J 13/00026; H02J 2310/12; Y02E 60/00; Y04S 40/126
See application file for complete search history.

(56) References Cited

U.S. PATENT DOCUMENTS 6,697,271 B2 *    2/2004    Corzine ................ H02M 7/487
                                                        363/71
9,219,423 B2 *    12/2015    Lv ....................... H02M 7/4835
(Continued)

OTHER PUBLICATIONS

Hussain Bassi, et al., "A New Hybrid Multilevel Inverter with Extended Number of Voltage Steps", International Journal of Electrical and Electronic Engineering & Telecommunications, 2019, pp. 1-8.

(Continued)

*Primary Examiner* — Elim Ortiz
(74) *Attorney, Agent, or Firm* — Oblon, McClelland, Maier & Neustadt, L.L.P.

(57) ABSTRACT

A 15-level multilevel inverter circuit includes an outer circuit, an inner circuit, a polarity changing circuit and a computing device. The outer circuit and the inner circuit include a plurality of DC voltage supplies. Each DC voltage supply has a positive and a negative terminal. The outer circuit, the inner circuit and the polarity changing circuit include a plurality of unidirectional power switches. Each unidirectional power switch is a transistor with a diode connected in parallel to the transistor. The computing device is configured to provide control signals to the gates of the plurality of the unidirectional power switches of the outer circuit and the inner circuit to add or subtract the voltage of each of inner DC voltage supplies to form square waveforms approximating sinusoidal waveforms, and to the gates of the plurality of the unidirectional power switches of the polarity changing circuit to switch the polarity of the voltage.

8 Claims, 17 Drawing Sheets

(51) Int. Cl.
*H02M 7/483* (2007.01)
*H02M 1/12* (2006.01)
*H02J 1/08* (2006.01)
*H02M 1/088* (2006.01)
*H02M 7/537* (2006.01)

(56) References Cited

U.S. PATENT DOCUMENTS

| | | | |
|---|---|---|---|
| 10,396,681 B1 | 8/2019 | Bassi et al. | |
| 10,447,174 B1* | 10/2019 | Porter, Jr. | H02M 3/33507 |
| 11,121,643 B1* | 9/2021 | Rawa | H02M 7/5395 |
| 2003/0214824 A1* | 11/2003 | Corzine | H02M 7/487 |
| | | | 363/71 |
| 2005/0127853 A1 | 6/2005 | Su | |
| 2011/0013428 A1* | 1/2011 | Abolhassani | H02M 7/49 |
| | | | 363/37 |
| 2014/0016380 A1* | 1/2014 | Barbosa | H02M 7/49 |
| | | | 363/71 |
| 2015/0200602 A1 | 7/2015 | Narimani | |
| 2015/0263644 A1 | 9/2015 | Fu | |
| 2017/0099013 A1 | 4/2017 | Martini | |
| 2018/0248493 A1 | 8/2018 | Mihalache | |
| 2018/0249447 A1* | 8/2018 | Lahetkangas | H04B 7/2656 |
| 2019/0131886 A1 | 5/2019 | Bassi et al. | |

OTHER PUBLICATIONS

Suvetha Poyyamani Sunddararaj, et al., "An Extensive Review of Multilevel Inverters Based on Their Multifaceted Structural Configuration, Triggering Methods and Applications", Electronics, vol. 9, No. 433, 2020, pp. 1-33.

M. Farhadi Kangarlu, Symmetric multilevel inverter with reduced components based on non-insulated dc voltage sources, IET Power Electronics, The Institution of Engineering and Technology, www.ietdl.org, vol. 5, Issue 5, 2012, pp. 571-581.

* cited by examiner

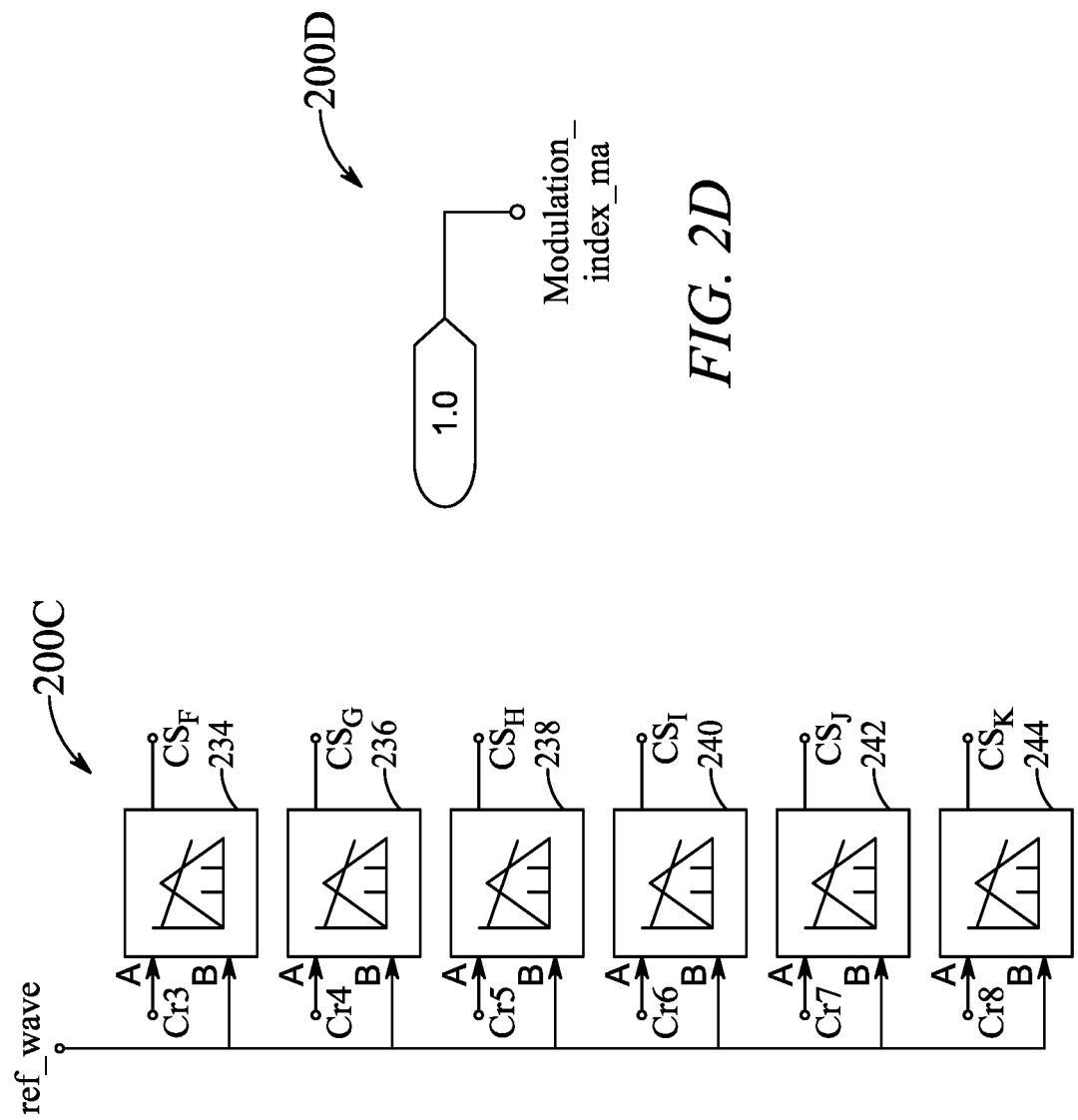

METHOD FOR CONTROLLING OUTPUT VOLTAGE AT A MULTILEVEL INVERTER

CROSS-REFERENCE TO RELATED APPLICATIONS

The present application is a Divisional of Ser. No. 17/010,897, now allowed, having a filing date of Sep. 3, 2020.

TECHNICAL FIELD

The present disclosure is directed to a multilevel inverter, which generates a high number of voltage levels with a reduced number of components.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In recent years, multilevel inverters have become increasingly popular in power applications because of their high voltage operation capability, low switching losses, and low output Electro Magnetic Interference (EMI). A multilevel inverter includes an array of switches and direct current (DC) voltage sources that generates an output voltage waveform. By increasing a number of voltage levels in the output voltage waveform, the output voltage waveform can approximate a sinusoidal waveform more closely, thereby reducing Total Harmonic Distortion (THD) of the output voltage waveform. Typically, a multilevel inverter produces more than two output voltage levels at the output.

An 11-level multilevel inverter was described in U.S. Pat. No. 10,396,681 B1, "Multilevel inverters with increased number of output steps"; a 7-level multilevel inverter in U.S. 2019/0131886 A1, "Multilevel inverter with reduced number of components", an 11-level multilevel inverter in "*A New Hybrid Multilevel Inverter with Extended Number of Voltage Steps*", King Abdulaziz University, Jeddah, December 2019, each incorporated herein by reference in its entirety). Further, an 11-level multilevel inverter was described (See: Sunddararaj, S.; Rangarajan, S; Subashini, N: "*An extensive review of multilevel inverters based on their multifaceted structural configuration, triggering methods and applications*", Sastra Deemed University, Clemson University, March 2020, each incorporated herein by reference in their entirety). However, these references discuss multilevel inverters of 11 levels or less.

Increasing the number of voltage levels in the multilevel inverters improves the approximation of the sinusoidal waveforms. A multilevel inverter of 15 levels has been described. (See: Farhadi-Kangarlu, M; Babaei, E.; Laali, S., "*Symmetric multilevel inverter with reduced components based on non-insulated dc voltage sources*", University of Tabriz, Urmia University, May 2012, incorporated herein by reference in its entirety). However, this reference uses 7 voltage sources to achieve the 15 levels, which increases the operational costs of a multilevel inverter, and may limit its useful lifetime due to aging and overheating of the circuit components.

Additionally, conventional multilevel inverters suffer from limitations which hamper their wide-spread use. In order to increase the number of voltage levels in output voltage waveforms, conventional multilevel inverters employ a large number of switches and DC voltage sources. Consequently, these conventional multilevel inverters are expensive and their overall size is significantly large.

Accordingly, it is one object of the present disclosure to provide an improved multilevel inverter that generates a high number of voltage levels with a reduced number of components such that harmonic distortion of the output of the multilevel inverter is substantially reduced as compared with conventional multilevel inverters.

SUMMARY

In an exemplary embodiment, a 15-level multilevel inverter is described, comprising an outer circuit including a plurality of outer direct current (DC) voltage supplies, each outer DC voltage supply having a positive and a negative terminal, a plurality of outer unidirectional power switches, each outer unidirectional power switch having an emitter, a collector, and a gate, wherein each outer unidirectional power switch is in parallel with a diode, an inner circuit including: a plurality of inner DC voltage supplies, each inner DC voltage supply having a positive and a negative terminal, a plurality of inner unidirectional power switches, each inner unidirectional power switch having an emitter, a collector, and a gate, wherein each unidirectional power switch is in parallel with a diode, a polarity changing circuit including: four polarity changing unidirectional power switches arranged in an H-bridge formation, each polarity changing unidirectional power switch having a emitter, a collector and a gate, wherein each polarity changing unidirectional power switch is in parallel with a diode, a multilevel inverter output terminal, a computing device including processing circuitry and program instructions configured to: provide control signals to the gates of the plurality of outer unidirectional power switches of the outer circuit to switch the plurality of outer DC voltage supplies of the outer circuit to form square waveforms which approximate sinusoidal waveforms, provide control signals to the gates of the plurality of the inner unidirectional power switches of the inner circuit to add or subtract each of the inner DC voltage supplies with a voltage at the multilevel inverter output terminal, provide control signals to the gates of the polarity changing unidirectional power switches to switch the polarity of the voltage at the multilevel inverter output terminal.

In another exemplary embodiment, a method for controlling an output voltage at a multilevel inverter output terminal of a 15-level multilevel inverter is described. The 15-level multilevel inverter includes five voltage supplies and thirteen unidirectional power switches, wherein each unidirectional power switch is turned ON by providing a control signal to a gate of the unidirectional power switch. The method comprises providing control signals to the gates of each of a first switch, a second switch, and a grounding switch to turn ON the first switch, the second switch, and the grounding switch, and generate a voltage level of zero at the multilevel inverter output terminal, or providing control signals to the gates of each of a second switch and a third switch to turn ON the second switch and the third switch and generate a voltage level of $2V_{dc}$ at the multilevel inverter output terminal, where $V_{dc}$ is selected from the range of 1-30 volts, or providing control signals to the gates of each of a first switch, a grounding switch, a fourth switch, and a fifth switch to turn ON the first switch, the grounding switch, the fourth switch, and the fifth switch and generate a voltage level of $3V_{dc}$ at the multilevel inverter output terminal, where $V_{dc}$ is selected from the range of 1-30 volts, or providing control signals to the gates of each of a second switch, a fourth switch and a fifth switch to turn ON the second switch, the fourth switch and the fifth switch and generate a voltage level of $4V_{dc}$ at the multilevel inverter output terminal, or providing control signals to the gates of each of a first switch, a fourth switch, a sixth switch, and a seventh switch to turn ON the first switch, the fourth switch, the sixth switch, and the seventh switch, and generate a voltage level of $5V_{dc}$ at the multilevel output inverter terminal, or providing control signals to the gates of each of a second switch, a fourth switch, a sixth switch and a seventh switch to turn ON the second switch, the fourth switch, the sixth switch and the seventh switch and generate a voltage level of $6V_{dc}$ at the multilevel inverter output terminal, or providing control signals to the gates of each of a first switch, a fourth switch, and a seventh switch to turn ON the first switch, the fourth switch, and the seventh switch, and generate a voltage level of $7V_{dc}$ at the multilevel inverter output terminal, or providing control signals to the gates of each of a second switch, a fourth switch and a seventh switch to turn ON the second switch, the fourth switch and the seventh switch and generate a voltage level of $8V_{dc}$ at the multilevel inverter output terminal, and providing control signals to the gates of each of a ninth and twelfth switch to switch the polarity to positive voltage at the multilevel inverter output terminal, or providing control signals to the gates of each of a tenth and an eleventh switch to switch polarity to negative voltage at the multilevel output terminal.

In another exemplary embodiment, a method for designing an N-level multilevel inverter circuit is described, comprising: forming a number, n, of switching cells, each switching cell including a voltage supply having a positive and a negative terminal, a first unidirectional power switch having a collector connected to the positive terminal of the voltage supply and a second unidirectional power switch having an emitter connected to ground and having a collector connected to an emitter of the first unidirectional power switch, calculating a number of output voltage levels, $N_{levels}$ which can be output from the N-level multilevel inverter circuit based on the equation $N_{levels}=4n+3$ calculating a number of unidirectional switches, $N_{switch}$, needed based on an equation $N_{switch}=2n+7$, and calculating a number of voltage supplies needed, $N_{supply}$, based on $N_{supply}=n+2$.

The foregoing general description of the illustrative aspect of the present disclosures and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following description when considered in connection with the accompanying drawings, wherein:

FIG. 2C depicts an exemplary third portion of the control circuit, according to exemplary aspects of the present disclosure;

FIG. 2D depicts an exemplary fourth portion of the control circuit, according to exemplary aspects of the present disclosure;

DETAILED DESCRIPTION

Figure 1A:
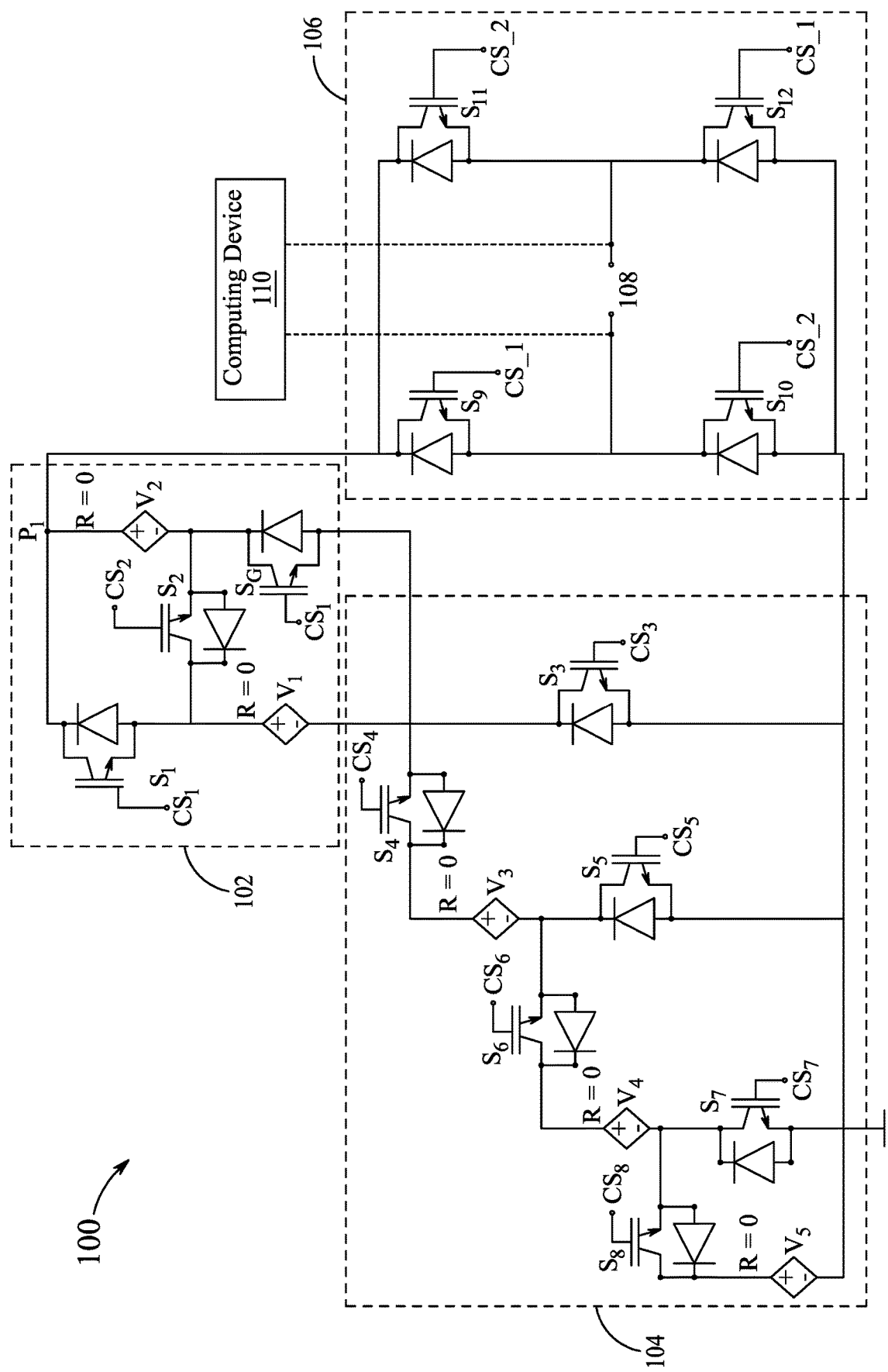
FIG. 1A illustrates a 15-level multilevel inverter circuit, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a 15-level multilevel inverter circuit and a method for controlling an output voltage at a multilevel inverter output terminal of the 15-level multilevel inverter circuit. The 15-level multilevel inverter circuit is capable of generating 15 direct current (DC) voltage levels with a reduced number of components such that harmonic distortion in an output waveform of the 15-level multilevel inverter circuit is substantially reduced. The 15-level multilevel inverter circuit is based on a Switched Capacitor Based Single Source (SCSS) circuit topology.

FIG. 1A illustrates the 15-level multilevel inverter circuit 100 according to aspects of the present disclosure. The 15-level multilevel inverter circuit 100 is capable of supplying power to household appliances, computing systems, network devices, and such like.

As can be seen in FIG. 1A, the 15-level multilevel inverter circuit 100 includes an outer circuit 102, an inner circuit 104, a polarity changing circuit 106, a multilevel inverter output terminal 108, and a computing device 110. The computing device 110 may include a controller (not shown in FIG. 1A). Further, the inner circuit 104 may include three switching cells (interchangeably referred to as cells).

Figure 11:
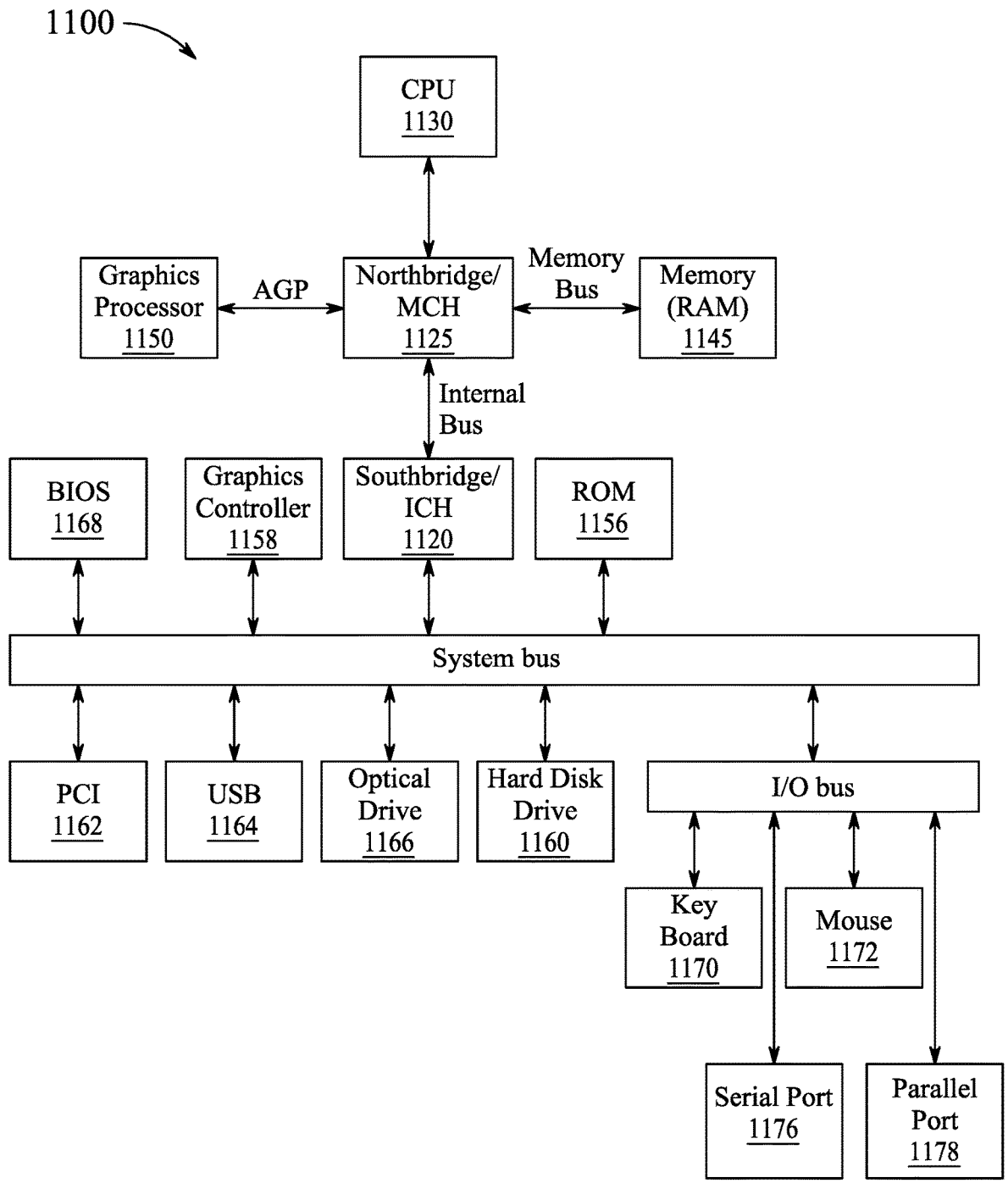
FIG. 11 is an exemplary schematic diagram of a data processing system used within the computing system, according to exemplary aspects of the present disclosure.
Figure 12:
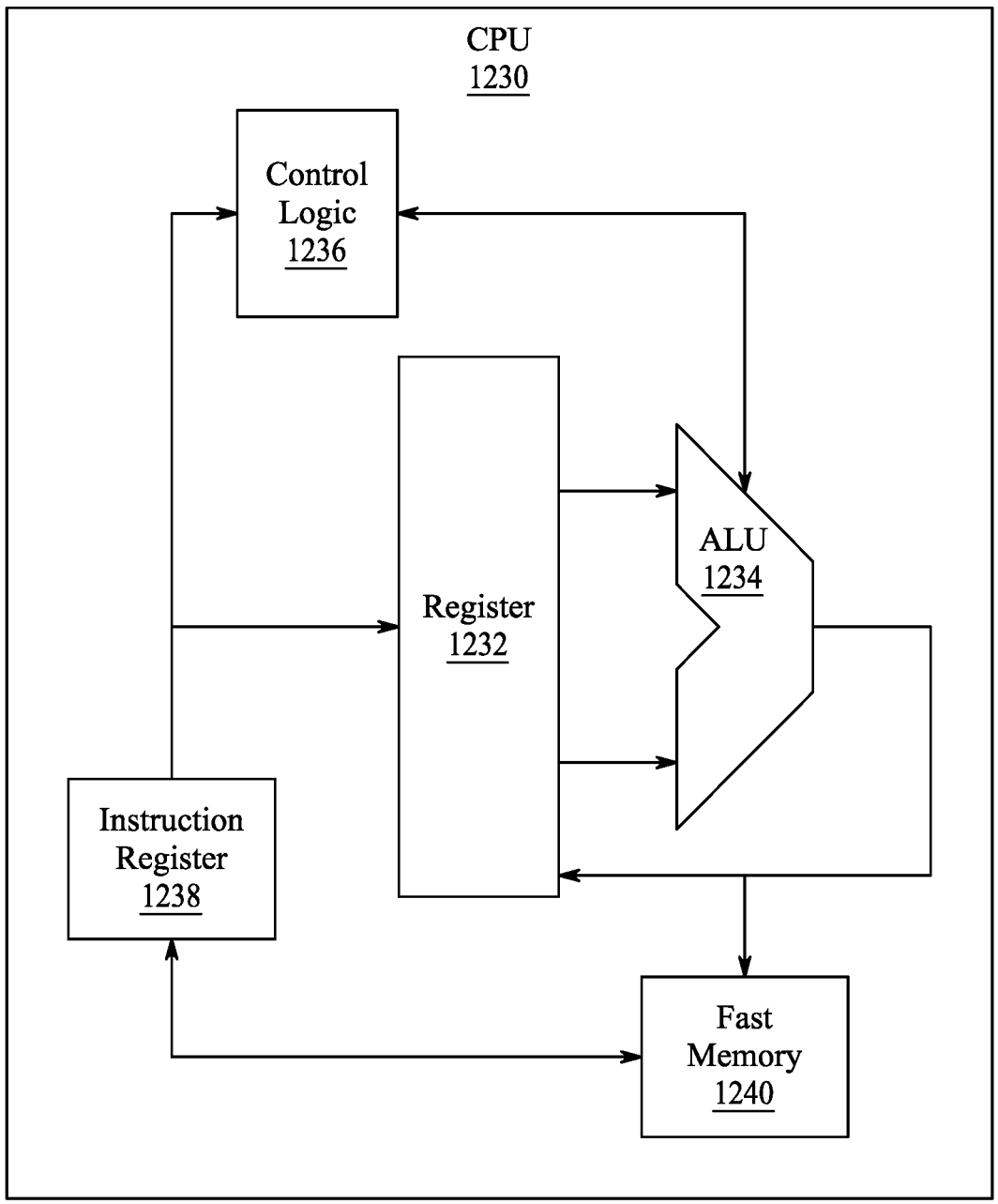
FIG. 12 is an exemplary schematic diagram of a processor used with the computing system, according to exemplary aspects of the present disclosure.

According to various aspects of the present disclosure, operations of the outer circuit 102, the inner circuit 104, and the polarity changing circuit 106 are controlled by the computing device 110. The computing device 110 may include a processing circuitry and program instructions, such as the computing device of FIG. 10. For example, the computing device 110 may include a processor (such as a microprocessor, a microcontroller, etc.), a memory (such as Read-Only Memory (ROM), Random-Access Memory (RAM), Electrically Erasable Programmable Read-Only Memory (EEPROM), etc.), circuit components (such as transistors, capacitors, resistors, logic gates, etc.), etc., in order to implement the control functionality (for example, as illustrated in FIG. 11 and FIG. 12). In some aspects of the present disclosure, certain portions of the functionality of the computing device 110 may also be implemented as instructions stored in the aforementioned memory and executed on the aforementioned processor. Although it shown in FIG. 1A that the computing device 110 is implemented within the 15-level multilevel inverter circuit 100, according to some aspects of present disclosure, the computing device 110 may be implemented outside the 15-level multilevel inverter circuit 100. In such scenarios, the computing device 110 may control the operations of the outer circuit 102, the inner circuit 104, and the polarity changing circuit 106 externally or remotely (for example, as one or more components illustrated in FIG. 13).

In some aspects of the present disclosure, the computing device 110 may be configured to provide control signals (not shown) to the plurality of outer unidirectional power switches of the outer circuit 102 to switch the plurality of outer DC voltage supplies of the outer circuit 102 to form/generate square waveforms or voltage blocks that approximate sinusoidal reference waveform or are close in shape to desired output sinusoidal reference waveform. Further, the computing device 110 may provide control signals to the plurality of the inner unidirectional power switches of the inner circuit 104 to add or subtract, or place in series or parallel, the voltage of each of the inner DC voltage supplies with each other and/or with a voltage at the multilevel inverter output terminal 108. In some aspects of the present disclosure, the inner circuit 104 may increase a number of DC output voltage levels (interchangeably referred to as output voltage levels or voltage levels) in the output waveforms (i.e., the square waveforms or the voltage blocks) generated by the outer circuit 102 to approximate the sinusoidal reference wave. In an example, the voltages of DC voltage sources of the inner circuit 104 are combined (by adding or subtracting, or placing in series or parallel) with the voltage blocks created by the outer circuit 102. The computing device 110 may further provide control signals to the polarity changing unidirectional power switches of the polarity changing circuit 106 to switch a polarity of the voltage at the multilevel inverter output terminal 108.

According to some aspects of the present disclosure, the 15-level multilevel inverter circuit 100 produces/generates fifteen (15) output voltage levels at the multilevel inverter output terminal 108 using thirteen (13) unidirectional power switches (interchangeably referred to as power switches or switches) and five (5) DC voltage supplies.

The outer circuit 102 includes two outer DC voltage supplies, namely a first voltage supply ($V_1$) and a second voltage supply ($V_2$). Each DC voltage supply, $V_1$ and $V_2$, has a positive and a negative terminal. In an example, voltage of $V_1$ and voltage of $V_2$, are such that $V_1=V_2=V_{dc}$. Resistance (R) of each of $V_1$ and $V_2$ is ideally considered to be zero. Further, the outer circuit 102 includes three outer unidirectional power switches namely a first switch ($S_1$), a second switch ($S_2$), and a grounding switch ($S_G$). Examples of a DC voltage supply include, but are not limited to, a battery, a solar cell, and a DC voltage generator. Also, examples of a unidirectional power switch include, but are not limited to, an Insulated-Gate Bipolar Transistor (IGBT), Metal-Oxide-Semiconductor Field-Effect Transistor (MOSFET), Integrated Gate-Commutated Thyristor (IGCT), Gate Turn-Off Thyristor (GTO), and Silicon Controlled Rectifier (SCR). Preferably the unidirectional power switches are insulated gate bipolar transistors (IGBTs). Each IGBT is antiparallel with a diode. An IGBT is a three-terminal power semiconductor device primarily used as an electronic switch which combines high efficiency and fast switching. An IGBT includes four alternating layers (P-N-P-N) that are controlled by a metal-oxide-semiconductor (MOS) gate structure. In a non-limiting example, an IGBT with an antiparallel diode may be an FGHL50T65SQDT IGBT available from Mouser Electronics, 1000 North Main Street, Mansfield, Tex., U.S.A.

Figure 1B:
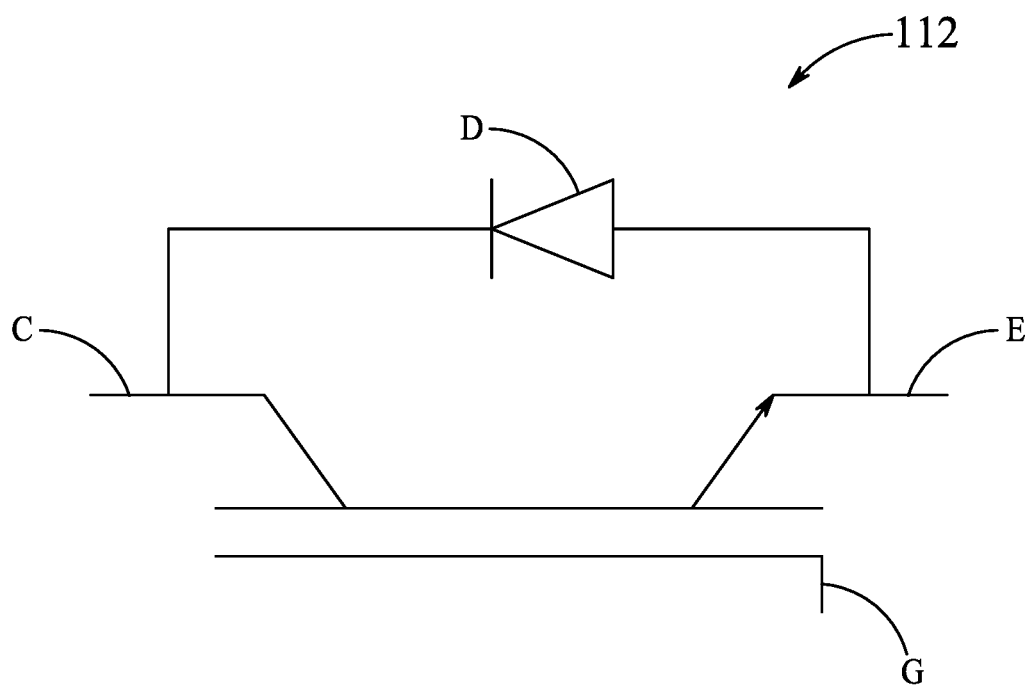
FIG. 1B shows a switching element having a transistor in parallel with a diode, according to exemplary aspects of the present disclosure.

As can be seen in FIG. 1A, each of $S_1$, $S_2$, and $S_G$ is a transistor in parallel with a diode. Each of the transistors includes an emitter, a collector, and a gate. Each of the transistors is connected to the corresponding diode with polarity opposite the polarity of the transistor, that is, an anode terminal of the diode is connected to the emitter and a cathode terminal of the diode is connected to the collector of the transistor. An example switching element 112 having a transistor in parallel with a diode is shown in FIG. 1B. As can be seen in FIG. 1B, the transistor includes an emitter (E), a collector (C), and a gate (G). The transistor is connected to the diode (D) with polarity opposite to polarity of the transistor. The switch 112 is similar to switches ($S_1$-$S_{12}$ and $S_G$) of FIG. 1A.

Referring back to FIG. 1A, an emitter of $S_1$ is connected to the positive terminal of $V_1$, while a collector of $S_1$ is connected to the positive terminal of $V_2$. Further, an emitter of $S_2$ is connected to the negative terminal of $V_2$, while a collector of $S_2$ is connected to the positive terminal of $V_1$. Also, the positive terminal of $V_2$ is connected to the polarity changing circuit 106. Further, an emitter of $S_G$ is connected to the negative terminal of $V_1$, and a collector of $S_G$ is connected to the negative terminal of $V_2$. $S_G$ disconnects $V_1$ from $V_2$, when $S_G$ is ON.

The outer circuit 102 functions to provide basic voltage levels of $V_{dc}$ or $2V_{dc}$. The basic voltage levels are achieved by operating $S_1$, $S_2$, and, $S_G$ such that the voltage supplies $V_1$ and $V_2$ of two cells can be connected in series or parallel. According to an aspect of the present disclosure, if $S_1$ and $S_G$ are turned ON, $V_1$ and $V_2$ will be connected in parallel at $P_1$ and the voltage at $P_1$ is $V_{dc}$. If $S_2$ is turned ON and $S_1$ and $S_G$ are turned OFF, $V_1$ and $V_2$ will be connected in series with additive polarity, thereby adding $V_1$ with $V_2$ leading to $2V_{dc}$ at $P_1$. Further, if $S_1$ is turned ON and $S_G$ is turned OFF, or if $S_1$ is turned OFF and $S_G$ is turned ON, and $S_2$ is turned OFF, then there is no circuit connection and the voltage at the output of the cell is zero.

According to some aspects of the present disclosure, the inner circuit 104 comprises three cells. Each cell includes one DC voltage source and three unidirectional power switches. As described earlier, the inner circuit 104 comprises three cells. Each cell includes one DC voltage source and two unidirectional power switches. The first cell includes a fifth voltage supply ($V_5$), a seventh switch ($S_7$), and an eight switch ($S_8$). The second cell includes a fourth voltage supply ($V_4$), a fifth switch ($S_5$), and a sixth switch ($S_6$). Further, the third cell includes a third voltage supply ($V_3$), a third switch ($S_3$), and a fourth switch ($S_4$). Each of $V_3$, $V_4$, and $V_5$ has a positive and a negative terminal. In an example, voltage of $V_3$, voltage of $V_4$, and voltage of $V_5$ are such that $V_3=V_4=V_5$. Resistance (R) of each of $V_3$, $V_4$, and $V_5$ is ideally zero and the voltage each of $V_3$, $V_4$, and $V_5$ equals $2V_{dc}$. Each of $S_3$, $S_4$, $S_5$, $S_6$, $S_7$, and $S_8$ has an emitter, a collector, and a gate. Further, each of $S_3$, $S_4$, $S_5$, $S_6$, $S_7$, and $S_8$ is an IGBT antiparallel with a diode. Each of IGBTs is connected to the corresponding diode with polarity opposite the polarity of the IGBT, that is, an anode terminal of the diode is connected to the emitter and a cathode terminal of the diode is connected to the collector of the IGBT.

According to an aspect of the present disclosure, the collector of $S_3$ is connected to the negative terminal of $V_1$, and the emitter of $S_3$ is connected to ground. The collector of $S_4$ is connected to the positive terminal of $V_3$, and the emitter of $S_4$ is connected to the negative terminal of $V_1$. According to an aspect of the present disclosure, the collector of $S_5$ is connected to the negative terminal of $V_3$, and the emitter of $S_5$ is connected to ground. $S_5$ grounds $V_3$ when $S_5$ ON. Further, the emitter of $S_6$ is connected to the negative terminal of $V_3$, and collector of $S_6$ is connected to the positive terminal of $V_4$.

Also, the collector of $S_7$ is connected to the negative terminal of $V_4$ and the emitter of $S_7$ is connected to ground. The collector of $S_8$ is connected to the positive terminal of $V_5$, and the emitter of $S_8$ is connected to the negative terminal of $V_4$. Further, $V_5$ is added to $V_4$ when $S_8$ is ON and $S_7$ is OFF. Also, $V_5$ is disconnected from $V_4$ when $S_8$ is OFF.

According to some aspects of the present disclosure, the polarity changing circuit 106 includes four polarity changing unidirectional power switches arranged in an H-bridge formation, each polarity changing unidirectional power switch having an emitter, a collector, and a gate, and where each polarity changing unidirectional power switch is in parallel with a diode. In some aspects of the present disclosure, the polarity changing circuit 106 includes a ninth switch ($S_9$), a tenth switch ($S_{10}$), an eleventh switch ($S_{11}$), and a twelfth switch ($S_{12}$). Each of $S_9$, $S_{10}$, $S_{11}$, and $S_{12}$ is an IGBT antiparallel with a diode. Each of the IGBTs of the polarity changing circuit is connected to the corresponding diode with polarity opposite the polarity of the IGBT, that is, an anode terminal of the diode is connected to the emitter and a cathode terminal of the diode is connected to the collector of the IGBT. The collector of $S_9$ and the collector of $S_{11}$ are connected to the positive terminal of $V_2$, and the emitter of $S_9$ and the emitter of $S_{11}$ are connected to the multilevel inverter output terminal 108. Further, the collector of $S_{10}$ and the collector of $S_{12}$ are connected to the multilevel inverter output terminal 108 and the emitter of $S_{10}$ and the emitter of $S_{11}$ are connected to ground. The computing device 110 may be configured to actuate the four-polarity changing unidirectional switches to provide positive DC voltage or negative DC voltage to the multilevel inverter output terminal 108 based on the hybrid modulation. In an aspect of the present disclosure, the computing device 110 may be configured to provide the control signals to the unidirectional power switches by the hybrid modulation (interchangeably referred to as hybrid modulation technique). The hybrid modulation is used to operate different unidirectional power switches. In an example, the hybrid modulation is a combination of fundamental frequency modulation and multilevel sinusoidal modulation, so that the output of the 15-level multilevel inverter circuit 100 inherits features of switching loss reduction from the fundamental frequency modulation, and a good harmonic performance from the multilevel sinusoidal modulation.

According to an aspect of the present disclosure, the voltage at the multilevel inverter output terminal 108 is positive when $S_9$ and $S_{12}$ are ON and $S_{10}$ and $S_{11}$ are OFF. Further, the voltage at the multilevel inverter output terminal 108 is negative when $S_9$ and $S_{12}$ are OFF and $S_{10}$ and $S_{11}$ are ON.

In operation, the inner circuit 104 functions to add voltage levels to the outer circuit 102. The voltage levels are increased by controlling the switches of the cells. The third cell adds $V_3$ to $V_1$ and/or $V_2$. The second cell further adds $V_4$ to $V_3$, and $V_1$ and/or $V_2$. The first cell adds $V_5$ to $V_4$, $V_3$, and $V_1$ and/or $V_2$. The addition of the voltage levels is controlled by the computing device 110 that provides control signals (for example, $CS_3$, $CS_2$, $CS_3$, $CS_4$, $CS_5$, $CS_6$, $CS_7$, $CS_8$, $CS\_1$, $CS\_2$) to the gates of appropriate switches ($S_1$, $S_2$, $S_G$, $S_3$, $S_4$, $S_5$, $S_6$, $S_7$, $S_8$, $S_9$, $S_{10}$, $S_{11}$, $S_{12}$) based on the hybrid modulation. According to an aspect of the present disclosure, the computing device 110 may be configured to provide the control signals $CS_1$, $CS_4$, and $CS_5$ to the gates of $S_1$ and $S_G$, $S_4$ and $S_5$, respectively such that $S_1$ and $S_G$, $S_4$ and $S_5$ are ON, and provide the control signals $CS_2$ and $CS_3$ to the gates of $S_2$ and $S_3$, respectively such that $S_2$, $S_3$, and $S_4$ are OFF, to generate a voltage of $3V_{dc}$ at the multilevel inverter output terminal 108. Switching ON $S_1$, $S_G$, $S_4$, and $S_5$ generates a circuit path that adds $V_1$ or $V_2$ with $V_4$, that is, $V_{dc}+2V_{dc}=3V_{dc}$. To generate a voltage of $4V_{dc}$, the computing device 110 may be configured to provide $CS_2$, $CS_4$, and $CS_5$ to the gates of $S_2$, $S_4$, and $S_5$, respectively such that $S_2$, $S_4$, and $S_5$ are ON, and provide $CS_3$ to $S_1$ and $S_G$, and $CS_3$ to $S_3$ such that $S_1$, $S_G$, and $S_3$ are OFF. Switching ON $S_2$, $S_4$, and $S_5$ generates a circuit path that adds $V_1$, $V_2$, and $V_4$ leading to $4V_{dc}$, that is, $V_{dc}\ V_{dc}+2V_{dc}=4V_{dc}$.

Similarly, the computing device 110 may provide $CS_3$, $CS_4$, $CS_6$, and $CS_7$ to the gates of $S_1$ and $S_G$, $S_4$, $S_6$ and $S_7$ such that $S_1$ and $S_G$, $S_4$, $S_6$ and $S_7$ are ON, and provide $CS_2$, $CS_3$, and $CS_5$ to the gates of $S_2$, $S_3$ and $S_5$, respectively such that $S_2$, $S_3$, and $S_5$ are OFF, to generate a voltage of $5V_{dc}$ at the multilevel inverter output terminal 108. Switching ON $S_1$ and $S_G$, $S_4$, $S_6$, and $S_7$ generates a circuit path through $S_1$ or $S_G$, $S_4$, $S_6$, and $S_7$ that adds $V_1$ or $V_2$ with $V_3$, and $V_4$ leading to $5V_{dc}$, that is, $V_{dc}+2V_{dc}+2V_{dc}=5V_{dc}$.

For a $6V_{dc}$ voltage output, the computing device 110 may provide $CS_2$, $CS_4$, $CS_6$, and $CS_7$ to the gates of $S_2$, $S_4$, $S_6$, and $S_7$ such that $S_2$, $S_4$, $S_6$, and $S_7$ are ON, and provide $CS_3$, $CS_3$, and $CS_5$ to the gates of $S_1$ and $S_G$, $S_3$, and $S_5$, respectively such that $S_1$ and $S_G$, $S_3$, and $S_5$ are OFF. Switching ON $S_2$, $S_4$, $S_6$, and $S_7$ generates a circuit path through $S_2$, $S_4$, $S_6$, and $S_7$ that adds $V_1$, $V_2$, $V_3$, and $V_4$ leading to $6V_{dc}$, that is, $V_{dc}\ V_{dc}+2V_{dc}+2V_{dc}=6V_{dc}$.

Similarly, the computing device 110 may provide $CS_1$, $CS_4$, $CS_6$, and $CS_8$ to the gates of $S_1$ and $S_G$, $S_4$, $S_6$, and $S_8$, such that S and $S_G$, $S_4$, $S_6$, and $S_8$ are ON, and provide $CS_2$, $CS_3$, $CS_5$, and $CS_7$ to the gates of $S_2$, $S_3$, $S_5$, and $S_7$ respectively such that $S_2$, $S_3$, $S_5$, and $S_7$ are OFF, to generate a voltage of $7V_{dc}$ at the multilevel inverter output terminal 108. Switching ON $S_1$ and $S_G$, $S_4$, $S_6$, and $S_8$ generates a circuit path through the control signals to the gates of $S_1$, $S_4$, $S_6$, and $S_8$ to cause a circuit path through $S_1$ or $S_G$, $S_4$, $S_6$, and $S_8$ that leads to $7V_{dc}$, that is, $V_{dc}+2V_{dc}+2V_{dc}+2V_{dc}=7V_{dc}$.

For an $8V_{dc}$ voltage output, the computing device 110 may provide $CS_2$, $CS_4$, $CS_6$, and $CS_8$ to the gates of $S_2$, $S_4$, $S_6$, and $S_8$, such that $S_2$, $S_4$, $S_6$, and $S_8$ are ON, and provide $CS_1$, $CS_3$, $CS_5$, and $CS_7$ to the gates of S and $S_G$, $S_3$, $S_5$, and $S_7$ respectively such that $S_1$ and $S_G$, $S_3$, $S_5$, and $S_7$ are OFF. Switching ON $S_2$, $S_4$, $S_6$, and $S_8$ generates a circuit path through $S_2$, $S_4$, $S_6$, and $S_8$ that adds $V_1$, $V_2$, $V_3$, $V_4$, and $V_5$ leading to $8V_{dc}$, that is, $V_{dc}\ V_{dc}+2V_{dc}+2V_{dc}+2V_{dc}=8V_{dc}$.

Also, the computing device 110 may be configured to provide control signals to the gates of the polarity changing unidirectional power switches to switch the polarity of the voltage at the multilevel inverter output terminal 108 between positive and negative. As described above, the computing device 110 is configured to provide the control signals to the unidirectional power switches by hybrid modulation. The hybrid modulation is employed to reduce the total harmonic distortions in the 15-level multilevel inverter circuit 100. The computing device 110 may provide CS_1 to the gates of $S_9$ and $S_{12}$, such that $S_9$ and $S_{12}$ are ON, and provide CS_2 to the gates of $S_{10}$ and $S_{11}$, such that $S_{10}$ and $S_{11}$ are OFF. $S_9$ and $S_{12}$ being ON leads to positive voltage at the multilevel inverter output terminal 108. Similarly, the computing device 110 may provide CS_2 to the gates of $S_9$ and $S_{12}$, such that $S_9$ and $S_{12}$ are OFF, and provide the CS_2 to the gates f $S_{10}$ and $S_{11}$, such that $S_{10}$ and $S_{11}$ are ON. $S_{10}$ and $S_{11}$ being ON leads to positive voltage at the multilevel inverter output terminal 108.

According to some aspects of the present disclosure, the variety of voltage levels provided by DC voltage supplies ($N_{variety}$) and value of blocking voltage of the switches ($V_{block}$) are determined. These parameters may determine a total cost of a multilevel inverter. To decrease the total cost of the multilevel inverter, $N_{variety}$ and $V_{block}$ may be minimized. In some aspects of the present disclosure, the variety of the voltage levels provided by DC voltage supplies ($N_{variety}$) may be used as a design parameter and set to a desired value. In an example, $N_{variety}$ is given by:

$$N_{variety}=2 \qquad (1)$$

With $E_n$ denoting the blocking voltage of switch $S_n$, $V_{block,\ n}$ may be calculated using the following steps. For a multilevel inverter with an inner circuit including three cells, i.e. n=3, $E_n$ and $V_{block,3}$ are determined by the following equations, $$E_1=E_2=V_{dc} \qquad (2)$$

$$E_G=2V_{dc} \qquad (3)$$

$$E_3=E_6=E_8=2V_{dc} \qquad (4)$$

$$E_4=(2\times 3)V_{dc} \qquad (5)$$

$$E_5=(2\times 2)V_{dc} \qquad (6)$$

$$E_7=(2\times 1)V_{dc} \qquad (7)$$

$$E_9=E_{10}=E_{11}=E_{12}=7V_{dc} \qquad (8)$$

$$V_{block,3}+E_1+E_2+E_G+E_3+E_4+E_5+E_6+E_7+E_8+E_9+E_{10}+E_{11}+E_{12}=50V_{dc} \qquad (9)$$

In general, $V_{block,n}$ is determined using the following equation.

$$V_{block,n}=2\left(n^2+6n+4-\sum_{k=1}^{n}k\right)V_{dc} \qquad (10)$$

According to some aspects of the present disclosure, in order to generate an increased number of DC output voltage levels without increasing a number of the unidirectional power switches and the DC voltage supplies, the DC voltage supplies are set to be different voltage values. In an example, $V_1=V_2=V_{dc}$ and $V_3=V_4=V_5=\ldots=V_{n+1}=2V_{dc}$, where $V_{dc}$ is selected from a range of 1-30 volts, and n is the number of cells.

According to some aspects of the present disclosure, selectively opening and/or closing the unidirectional power switches can result in a specific voltage level. Table 1 (provided below) illustrates the ON/OFF pattern of the unidirectional power switches for generation of the various DC output voltage levels of the 15-level multilevel inverter circuit 100 (interchangeably referred to as the 15-level multilevel inverter 100). The switch $S_G$ receives $CS_1$ at the gate terminal which is also provided to the gate terminal of $S_1$ and therefore, $S_G$ is switched ON whenever $S_1$ is switched ON. Table 1 lists the output voltage of the 15-level multilevel inverter 100 for different switching states.

TABLE 1

Switching patterns of unidirectional power switches

| State | $V_o/V_{0,max}$, pu | $V_o/V$ | Switches (Unidirectional Power Switches) |
|---|---|---|---|
| 1 | 0 | 0 | $S_1$, $S_2$, $S_G$ |
| 2 | $2V_{dc}$ | $V_3$ | $S_2$, $S_3$, |
| 3 | $3V_{dc}$ | $(V_1//V_2) + V_3$ | $S_1$, $S_4$, $S_5$ |
| 4 | $4V_{dc}$ | $V_1 + V_2 + V_3$ | $S_2$, $S_4$, $S_5$ |
| 5 | $5V_{dc}$ | $(V_1//V_2) + V_3 + V_4$ | $S_1$, $S_4$, $S_6$, $S_7$ |
| 6 | $6V_{dc}$ | $V_1 + V_2 + V_3 + V_4$ | $S_2$, $S_4$, $S_6$, $S_7$ |
| 7 | $7V_{dc}$ | $(V_1//V_2) + V_3 + V_4 + V_5$ | $S_1$, $S_4$, $S_6$, $S_8$ |
| 8 | $8V_{dc}$ | $V_1 + V_2 + V_3 + V_4 + V_5$ | $S_2$, $S_4$, $S_6$, $S_8$ |

In Table 1, the first column "State" represents the state of the 15-level multilevel inverter circuit 100, of which 8 are shown. The second column "$V_o/V_o$, max, pu" represents the maximum output voltage for each state, and the third column "$V_o/V$" represents these voltages from the DC voltage supplies that are added or subtracted in order to generate the corresponding maximum output voltage. The fourth column "Switches (Unidirectional Power Switches)" represents the unidirectional power switches that are ON, in order to generate the corresponding voltage. In an example, switching of the unidirectional power switches in certain combinations can lead to generation of different output voltage levels.

According to an aspect of the present disclosure, by closing and opening the different switches $S_1$-$S_8$, it is possible to generate the output voltage levels, or voltage blocks, for the 15-level multilevel inverter circuit 100: 0, $\pm 2V_{dc}$, $\pm 3V_{dc}$, $\pm 4V_{dc}$, $\pm 5V_{dc}$, $\pm 6V_{dc}$, $\pm 7V_{dc}$, and $+8V_{dc}$ In an example, each unidirectional power switch is turned ON by providing a control signal to a gate of the unidirectional power switch. In an example, when the control signals are provided to the gates of each of $S_1$, $S_2$, and $S_G$, then $S_1$, $S_2$, and $S_G$ are turned ON, and a zero output voltage (i.e., a voltage level of zero) is generated at the multilevel inverter output terminal 108, as shown by state 1 of Table 1.

In yet another example, when control signals are provided to the gates of each of $S_2$ and $S_3$, then $S_2$ and $S_3$ are turned ON, and a voltage (or a voltage level) of $2V_{dc}$ is generated at the multilevel inverter output terminal 108, as shown by state 2 of Table 1.

As shown by state 3 of Table 1, when control signals are provided to the gates of each of $S_1$, $S_G$, $S_4$, and $S_5$, then $S_1$, $S_G$, $S_4$, and $S_5$ are turned ON, and a voltage of $3V_{dc}$ is generated at the multilevel inverter output terminal 108. As shown by state 4 of Table 1, when control signals are provided to the gates of each of $S_2$, $S_4$, and $S_5$, then $S_2$, $S_4$, and $S_5$ are turned ON, and a voltage of $4V_{dc}$ is generated at the multilevel inverter output terminal 108. As shown by state 5 of Table 1, when control signals are provided to the gates of each of $S_1$, $S_G$, $S_4$, $S_6$, and $S_7$, then $S_1$, $S_G$, $S_4$, $S_6$, and $S_7$ are turned ON, and a voltage of $5V_{dc}$ is generated at the multilevel inverter output terminal 108.

As shown by state 6 of Table 1, when control signals are provided to the gates of each of $S_2$, $S_4$, $S_6$, and $S_7$, then $S_2$, $S_4$, $S_6$, and $S_7$ are turned ON, and a voltage of $6V_{dc}$ is generated at the multilevel inverter output terminal 108. As shown by state 7 of Table 1, when control signals are provided to the gates of each of $S_1$, $S_G$, $S_4$, $S_6$, and $S_8$, then $S_1$, $S_G$, $S_4$, $S_6$, and $S_8$ are turned ON, and a voltage of $7V_{dc}$ is generated at the multilevel inverter output terminal 108. As shown by state 8 of Table 1, when control signals are provided to the gates of each of $S_2$, $S_4$, $S_6$, and $S_8$, then $S_2$, $S_4$, $S_6$, and $S_8$ are turned ON, and a voltage of $8V_{dc}$ is generated at the multilevel inverter output terminal 108.

According to some aspects of the present disclosure, when the control signals are provided to the gates of each of $S_9$, $S_{10}$, $S_{11}$, and $S_{12}$, the polarity of the voltage at the multilevel inverter output terminal 108 switches between positive and negative. For example, the voltage at the multilevel inverter output terminal 108 is positive when $S_9$ and $S_{12}$ are ON and $S_{10}$ and $S_{11}$ are OFF. Further, the voltage at the multilevel inverter output terminal 108 is negative when $S_9$ and $S_{12}$ are OFF, and $S_{10}$ and $S_{11}$ are ON. Table 1 illustrates positively polarized seven voltage levels generated when $S_9$ and $S_{12}$ are ON and $S_{10}$ and $S_{11}$ are OFF, and level 1 where the voltage (or a voltage level) is 0. When $S_{10}$ and $S_{11}$ are ON and $S_9$ and $S_{12}$ are OFF, the 15-level multilevel inverter circuit 100 generates negatively polarized seven voltage levels at the multilevel inverter output terminal 108.

According to some aspects of the present disclosure, the control signals are generated by the computing device 110 (or a component therein, such as a control circuit) to control the unidirectional power switches. In an example, the computing device 110 may generate $CS_1$ for controlling $S_1$ and $S_G$. Further, the computing device 110 may generate a control signal $CS_2$ for controlling $S_2$. The computing device 110 may also generate control signals $CS_3$, $CS_4$, $CS_5$, $CS_6$, $CS_7$, and $CS_8$ for controlling $S_3$, $S_4$, $S_5$, $S_6$, $S_7$, and $S_8$, respectively. Further, the computing device 110 may generate a control signal CS_1 for controlling $S_9$ and $S_{12}$, and the computing device 110 may generate a control signal CS_2 for controlling $S_{10}$ and $S_{11}$. The manner in which the computing device 110 generates the control signals for the unidirectional power switches of the 15-level multilevel inverter circuit 100 is described in more detail in conjunction with FIG. 2A-FIG. 2F.

Although, a 15-level multilevel inverter is described, in some aspects of the present disclosure, a multilevel inverter having more than or less than 15 output voltage levels may be designed using a combination of DC voltage sources and unidirectional power switches.

FIGS. 2A-2F depict an example control circuit 200 that controls the 15-level multilevel inverter circuit 100 to operate with hybrid modulation according to exemplary aspects of the present disclosure. The control circuit 200 is an example circuit for tested in a simulation environment to validate the functioning 15-level multilevel inverter circuit 100.

Figures 2A, 2B:
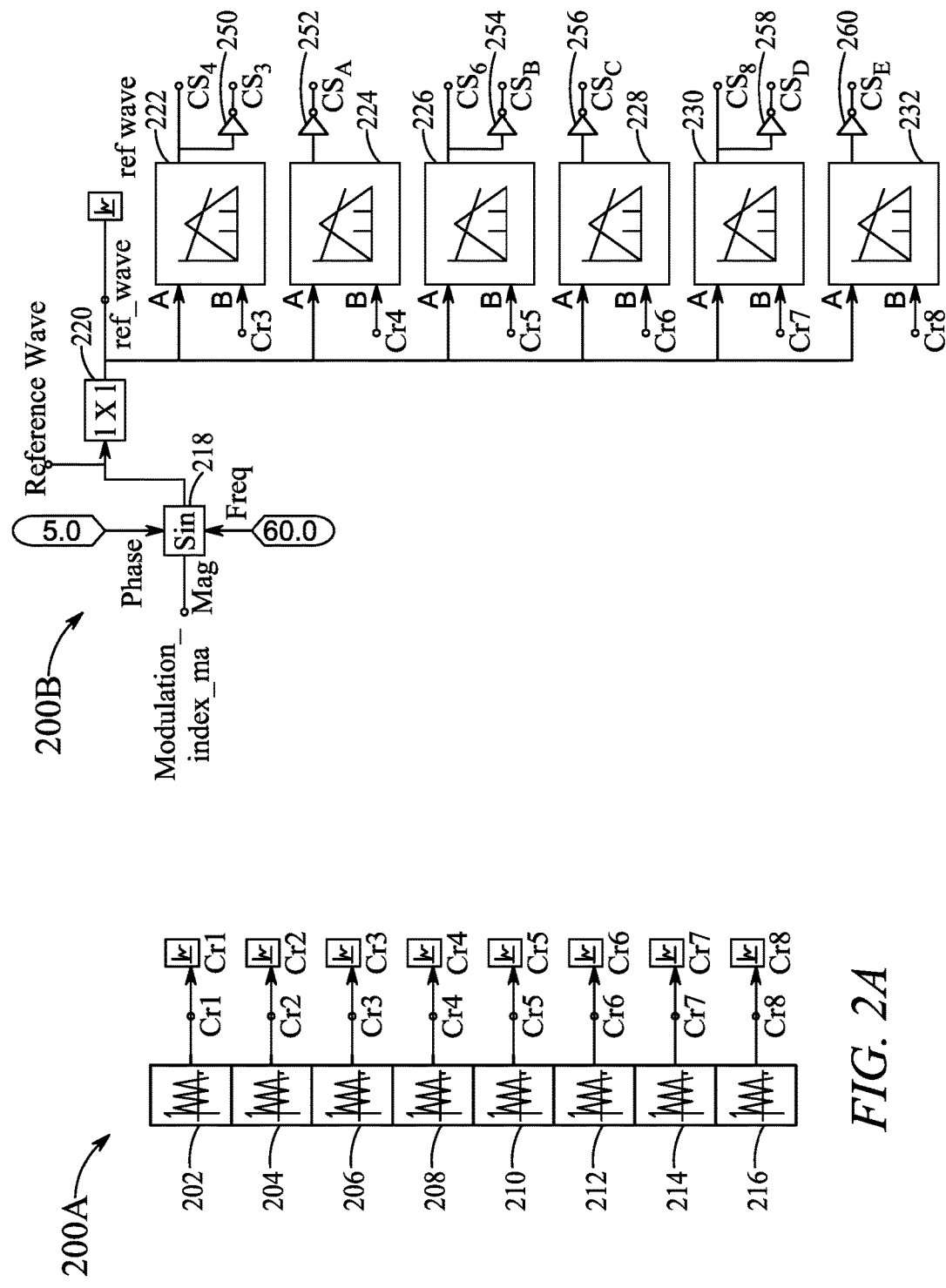
FIG. 2A depicts an exemplary first portion of a control circuit that controls the 15-level multilevel inverter circuit to operate with hybrid modulation, according to exemplary aspects of the present disclosure.
FIG. 2B depicts an exemplary second portion of the control circuit, according to exemplary aspects of the present disclosure.
Figure 4:
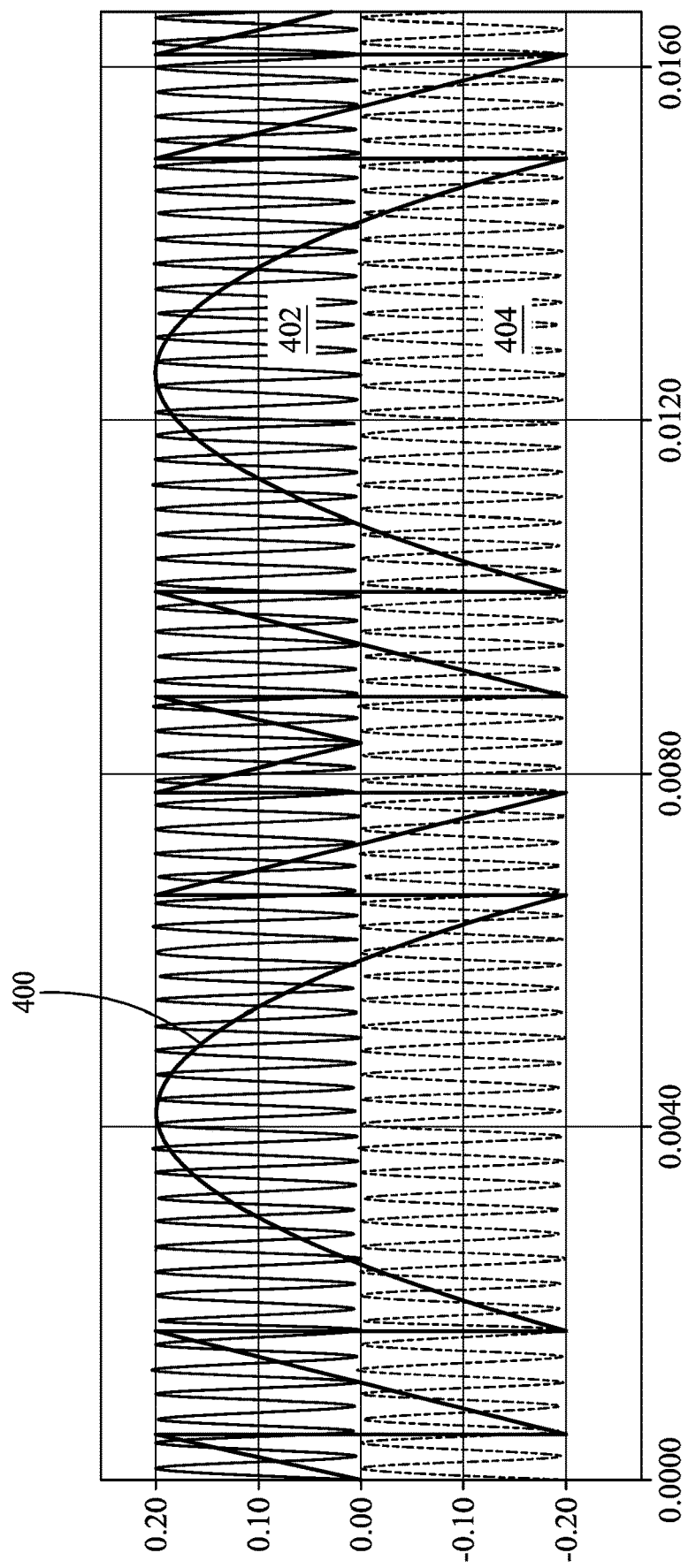
FIG. 4 shows a sinusoidal reference wave for the 15-level multilevel inverter circuit, according to exemplary aspects of the present disclosure.

FIG. 2A depicts a first portion 200A of the control circuit 200. According to some aspects of the present disclosure, the first portion 200A of the control circuit 200 includes eight triangle wave generators 202, 204, 206, 208, 210, 212, 214, and 216. As can be seen in FIG. 2A, the triangle wave generators 202, 204, 206, 208, 210, 212, 214, and 216 generate triangle carrier voltages Cr1, Cr2, Cr3, Cr4, Cr5, Cr6, Cr7, and Cr8, respectively. The triangle carrier voltages Cr1 and Cr2 are shown in FIG. 4. In an example, the triangle carrier voltages may interchangeably be referred to as triangular carriers.

FIG. 2B and FIG. 2C depict a second portion 200B and a third portion 200C, respectively, of the control circuit 200. The second portion 200B of the control circuit 200 includes a sinusoidal wave generator 218 connected to an absolute value circuitry 220. The sinusoidal wave generator 218 generates a reference signal "$V_1 \sin(2\pi ft)$". The reference signal is labeled as "Reference Wave" in FIG. 2B. The reference signal "$V_1 \sin(2\pi ft)$" is then input to the absolute value circuitry 220. The absolute value circuitry 220 generates an absolute value of the reference signal, i.e., $|V_1 \sin(2\pi ft)|$. In an example, the absolute value of the reference signal may be referred to as an absolute reference signal. The absolute reference signal is labeled as "ref_wave" in FIG. 2B.

In some aspects of the present disclosure, the second portion 200B and the third portion 200C, in combination, includes fourteen comparators 222, 224, 226, 228, 230, 232, 234, 236, 238, 240, 242, 244, 246, and 248. Further, the second portion 200B and the third portion 200C, in combination, includes seven logic inverters 250, 252, 254, 256, 258, and 260

According to some aspects of the present disclosure, the "ref_wave" signal is fed to node A of the comparator 222 and the triangle carrier voltage Cr3 is fed to node B of the comparator 222. The comparator 222 then generates a control signal $CS_4$. Further, the logic inverter 250 generates a control signal $CS_3$ by inverting a logic level of the control signal $CS_4$. In some aspects of the present disclosure, the "ref_wave" signal is fed to node A of the comparator 224 and triangle carrier voltage Cr4 is fed to node B of the comparator 224. A control signal $CS_A$ is generated at output of the logic inverter 252. In some aspects of the present disclosure, the "ref_wave" signal is fed to node A of comparator 226 and the triangle carrier voltage Cr5 is fed to node B of the comparator 226. The comparator 226 then generates a control signal $CS_6$. Further, the logic inverter 254 generates a control signal $CS_B$ by inverting a logic level of the control signal $CS_6$.

Further, in some aspects of the present disclosure, the "ref_wave" signal is fed to Node A of the comparator 228 and the triangle carrier voltage Cr6 is fed to Node B of the comparator 228. A control signal $CS_C$ is generated at output of the logic inverter 256. In some aspects of the present disclosure, the "ref_wave" signal is fed to node A of the comparator 230 and triangle carrier voltage Cr7 is fed to node B of the comparator 230. The comparator 230 generates a control signal $CS_8$. Further, the logic inverter 258 generates a control signal $CS_D$ by inverting a logic level of the control signal $CS_8$. Also, in some aspects of the present disclosure, the "ref_wave" signal is fed to node A of the comparator 232 and the triangle carrier voltage Cr8 is fed to node B of the comparator 232. A control signal $CS_E$ is generated at output of the logic inverter 260.

According to some aspects of the present disclosure, the triangle carrier voltage Cr3 is fed to node A of the comparator 234 and "ref_wave" signal is fed to node B of the comparator 234. The comparator 234 generates a control signal $CS_F$. In some aspects of the present disclosure, the triangle carrier voltage Cr4 is fed to node A of the comparator 236 and the "ref_wave" signal is fed to node B of the comparator 236. The comparator 236 then generates a control signal $CS_G$. Further, in some aspects of the present disclosure, the triangle carrier voltage Cr5 is fed to node A of the comparator 238 and the "ref_wave" signal is fed to node B of the comparator 238. The comparator 238 then generates a control signal $CS_H$.

In some aspects of the present disclosure, the triangle carrier voltage Cr6 is fed to node A of the comparator 240 and the "ref_wave" signal is fed to node B of the comparator 240. The comparator 240 then generates a control signal $CS_I$. Further, in some aspects of the present disclosure, the triangle carrier voltage Cr7 is fed to node A of the comparator 242 and the "ref_wave" signal is fed to node B of the comparator 242. The comparator 242 then generates a control signal $CS_3$. In some aspects of the present disclosure, the triangle carrier voltage Cr8 is fed to node A of the comparator 244 and the "ref_wave" signal is fed to node B of the comparator 244. The comparator 244 then generates a control signal $CS_K$.

According to some aspects of the present disclosure, the "Reference Wave" signal is provided to node A of the comparator 246 and the triangle carrier voltage Cr2 is fed to node B of the comparator 246. The comparator 246 then generates a control signal CS_1 Further, the triangle carrier voltage Cr1 is provided to node A of the comparator 248 and the "Reference Wave" signal is fed to node B of the comparator 248. The comparator 248 then generates a control signal CS_2.

FIG. 2D depicts a fourth portion 200D of the control circuit 200. As can be seen in FIG. 200D, a modulation index m of the reference signal is set to be 1.

Figures 2E, 2F:
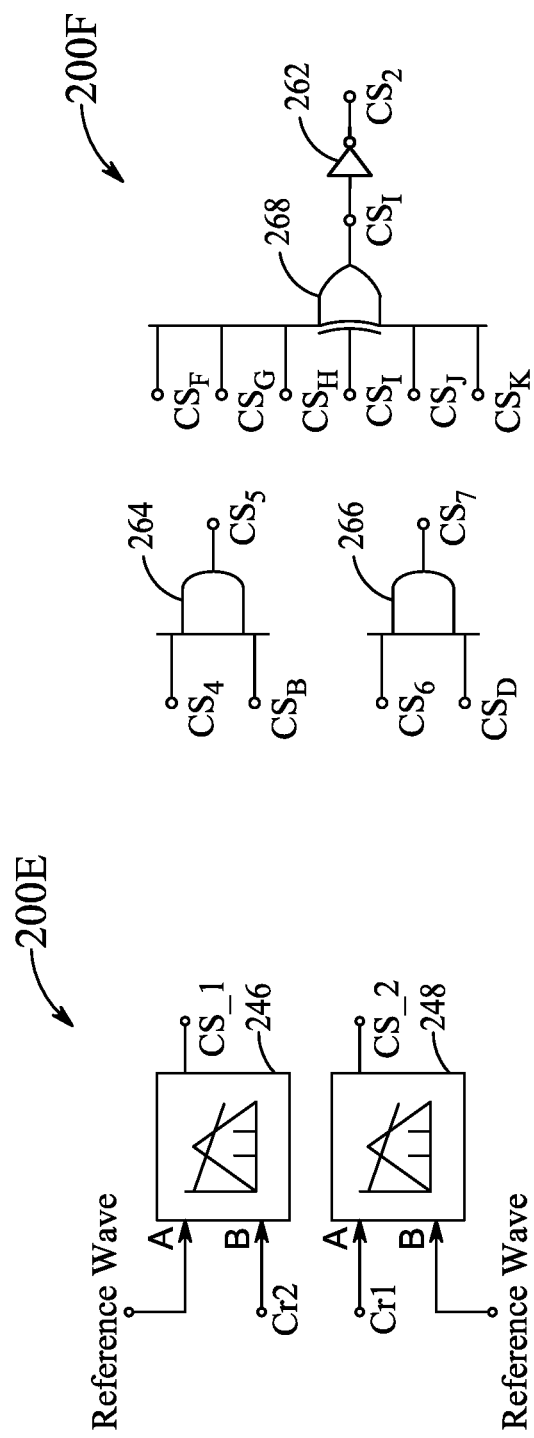
FIG. 2E depicts an exemplary fifth portion of the control circuit, according to exemplary aspects of the present disclosure.
FIG. 2F depicts an exemplary sixth portion of the control circuit, according to exemplary aspects of the present disclosure.

FIG. 2E and FIG. 2F depict a fifth portion 200E and a sixth portion 200F, respectively, of the control circuit 200. The fifth portion 200E and the sixth portion 200F, in combination, includes a logic inverter 262, two AND logic gates 264 and 266, and a XOR logic gate 268.

In some aspects of the present disclosure, the control signals $CS_A$ and $CS_B$ are fed to inputs of the AND logic gate 264, and an output of the AND logic gate 264 is a control signal $CS_5$. Also, the control signals $CS_6$ and $CS_D$ are fed to inputs of the AND logic gate 266, respectively, and an output of the AND logic gate 266 is a control signal $CS_7$. In some aspects of the present disclosure, the control signals $CS_F$, $CS_G$, $CS_H$, $CS_I$, $CS_J$, and $CS_K$ are fed to inputs of the XOR logic gate 268. An output of the XOR logic gate 268 is a control signal $CS_1$. Further, the logic inverter 262 generates a control signal $CS_2$ by inverting a logic level of the control signal $CS_1$.

Figure 3:
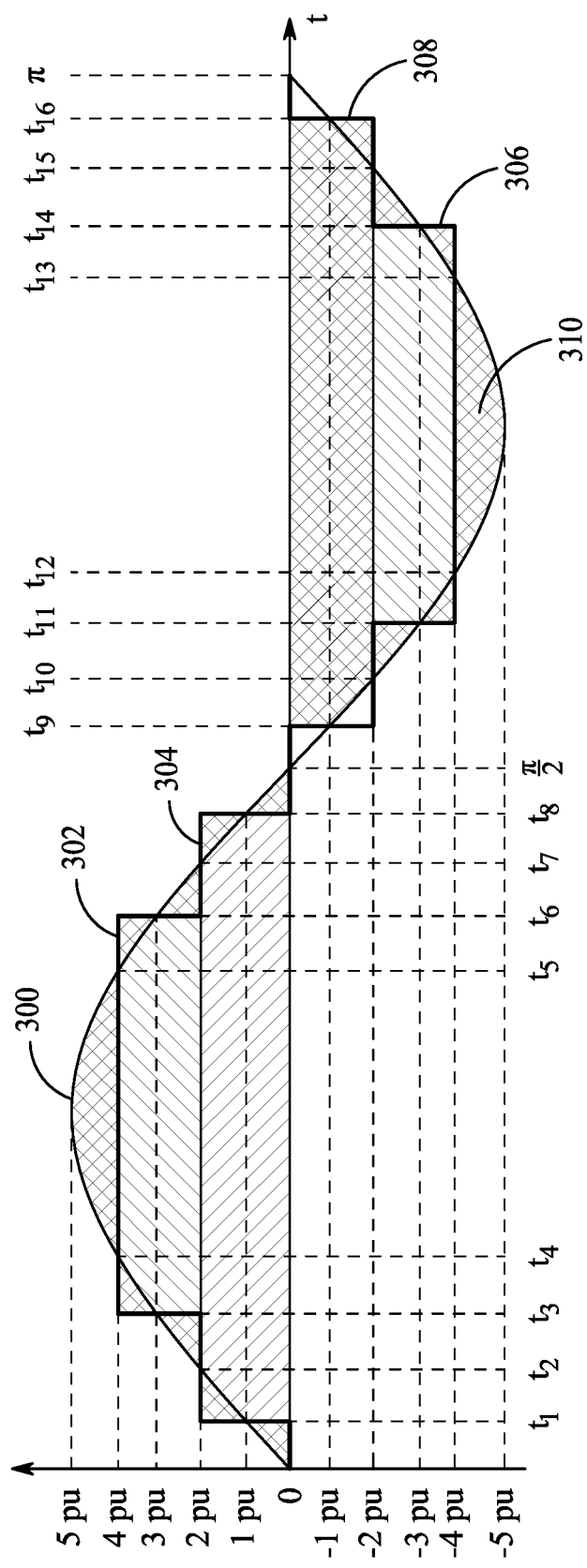
FIG. 3 shows a sinusoidal waveform for the 15-level multilevel inverter circuit, according to exemplary aspects of the present disclosure.

FIG. 3 shows a sinusoidal waveform 300 for the 15-level multilevel inverter circuit 100, according to exemplary aspects of the present disclosure. As illustrated in FIG. 3, the sinusoidal waveform 300 generated by the 15-level multilevel inverter circuit 100 includes two voltage blocks in each half-cycle.

As can be seen in FIG. 3, the sinusoidal waveform 300 includes voltage blocks 302 and 304 in a first half-cycle, and voltage blocks 306 and 308 in a second half-cycle. A voltage block is interchangeably referred to as square wave block. According to an aspect of the present disclosure, the sinusoidal waveform 300 is a 15-level waveform that corresponds to 15 DC output voltage levels where maximum output voltage level $V_{o, max}$ is equal to 5 Vdc (or 5 pu, that is, per unit). To obtain the sinusoidal waveform 300, the control circuit 200 of FIGS. 2A-2F may employ a hybrid modulation technique, using which the unidirectional power switches of the 15-level multilevel inverter circuit 100 can be operated at different frequencies. In an example, to improve the total harmonic distortion of the output waveform of the 15-level multilevel inverter circuit 100, the hybrid modulation technique is utilized. In an example, the unidirectional power switches of the inner circuit 104 of the 15-level multilevel inverter circuit 100 are provided with signals that are modulated to generate the shaded block area with large grid pattern 310 (as shown in FIG. 3) according to the following equation (11).

$$v_{ref}=|V_1 \sin(2\pi ft)|-0.4[u(t-t_1)-u(t-t_8)-u(t-t_9)+u(t-t_{16})]-0.4[u(t-t_3)-u(t-t_6)-u(t-t_{11})+u(t-t_{14})] \quad (11)$$

In the above equation (11), "$v_{ref}$" represents a sinusoidal reference wave, "$|V_1 \sin(2\pi ft)|$" represents an absolute reference signal, "$V_1$" represents "$V_{dc}$", "f" represents a modulation frequency, "t" represents time, and "u(t)" represents a magnitude of the control signal/a step function. The absolute reference signal may interchangeably be referred to as a reference voltage.

The reference voltage ($V_1 \sin(2\pi ft)$) is an absolute value of the sinusoidal waveform 300 and represents an instantaneous voltage magnitude of the output voltage. Further, the set of step functions represents voltage magnitudes of the four voltage blocks 302, 304, 306, and 308 in one cycle. In an example, the voltage block 404 is represented by $0.4[u(t-t_1)-u(t-t_8)]$, the voltage block 302 is represented by $0.4[u(t-t_3)-u(t-t_6)]$, the voltage block 406 is represented by $0.4[u(t-t_{11})-u(t-t_{14})]$, and the voltage block 408 is represented by $0.4[u(t-t_9)-u(t-t_{16})]$.

In some aspects of the present disclosure, to obtain intervals of each voltage block, a peak of the voltage blocks ($V_{core}$) and a number of starts and ends of the voltage blocks per half-cycle ($T_{core}$, for example, $t_1$ and $t_3$ in the sinusoidal waveform 300 of the FIG. 3) may be determined. In an example, the peak of the voltage blocks and the number of starts and ends of the voltage blocks per half-cycle may be determined using equations 12, 13, and 14 as provided below.

$$N_{core} = n - 1 \quad (12)$$

$$V_{core} = \frac{1}{N_{core} + 0.5} \quad (13)$$

$$T_{core} = 4N_{core} \quad (14)$$

In the above equations, "$N_{core}$" represents a number of voltage blocks per half-cycle, n represents the number of cells, "$V_{core}$" represents the peak of the voltage blocks, and "$T_{core}$" represents number of starts and ends of the voltage blocks per half-cycle (for example, $t_1$ and $t_3$ in the sinusoidal waveform 300 of the FIG. 3).

According to an aspect of the present disclosure, a general expression for the sinusoidal reference wave $v_{ref}$ is given by:

$$v_{ref} = V_1 \sin(2\pi ft) - V_{core} \left[ \sum_{i=1,3,5,\ldots}^{\frac{T_{core}}{2}-1} u(t-t_i) - u(t-t_{i+T_{core}}) + \sum_{j=2,4,6,\ldots}^{\frac{T_{core}}{2}-2} u(t-t_{T_{core}-j}) - u(t-t_{2T_{core}-j}) \right] \quad (15)$$

FIG. 4 shows a sinusoidal reference wave 400 for the 15-level multilevel inverter circuit 100, according to exemplary aspects of the present disclosure.

As can be seen in FIG. 4, the sinusoidal reference wave 400 ranges from 0.20 to −0.20. Further, the sinusoidal reference wave 400 is modulated using two triangular carriers, 402 and 404. In an example, the triangular carrier 402 represents the triangular carrier "Cr1" and the triangular carrier 404 represents the triangular carrier "Cr2" (as described in FIG. 2A). According to an aspect of the present disclosure, a modulation index (m) for the sinusoidal reference wave 400 is calculated using below equation.

$$m = \frac{v_{ref}}{Cr1, 2(peak)}, \quad (16)$$

where $0 \le m \le 1$.

In equation (16), "$v_{ref}$" represents the sinusoidal reference wave 400, "Cr1" represents a first triangular carrier, and "Cr2" represents a second triangular carrier. As described previously, the first triangular carrier (Cr1) and the second triangular carrier (Cr2) are generated by the control circuit 200 using triangle wave generators 202 and 204.

Figure 5:
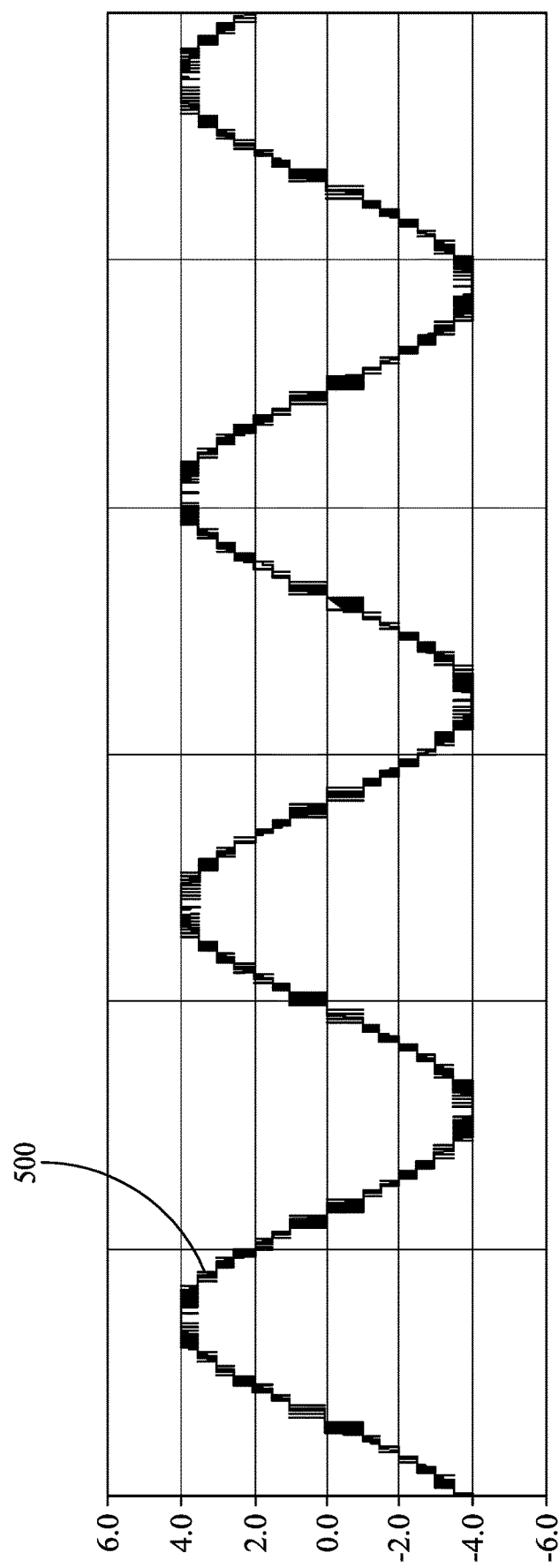
FIG. 5 shows an output voltage waveform of the 15-level multilevel inverter circuit, according to exemplary aspects of the present disclosure.

FIG. 5 shows an output voltage waveform 500 of the 15-level multilevel inverter circuit 100, according to exemplary aspects of the present disclosure. According to an aspect of the present disclosure, the voltages of the output of the various unidirectional power switches $S_1$-$S_{12}$ of the 15-level multilevel inverter circuit 100 form the output voltage waveform 500. As can be seen in FIG. 5, the output voltage waveform 500 is of staircase type and a total number of levels in the output voltage waveform 500 is 15.

Figure 6:
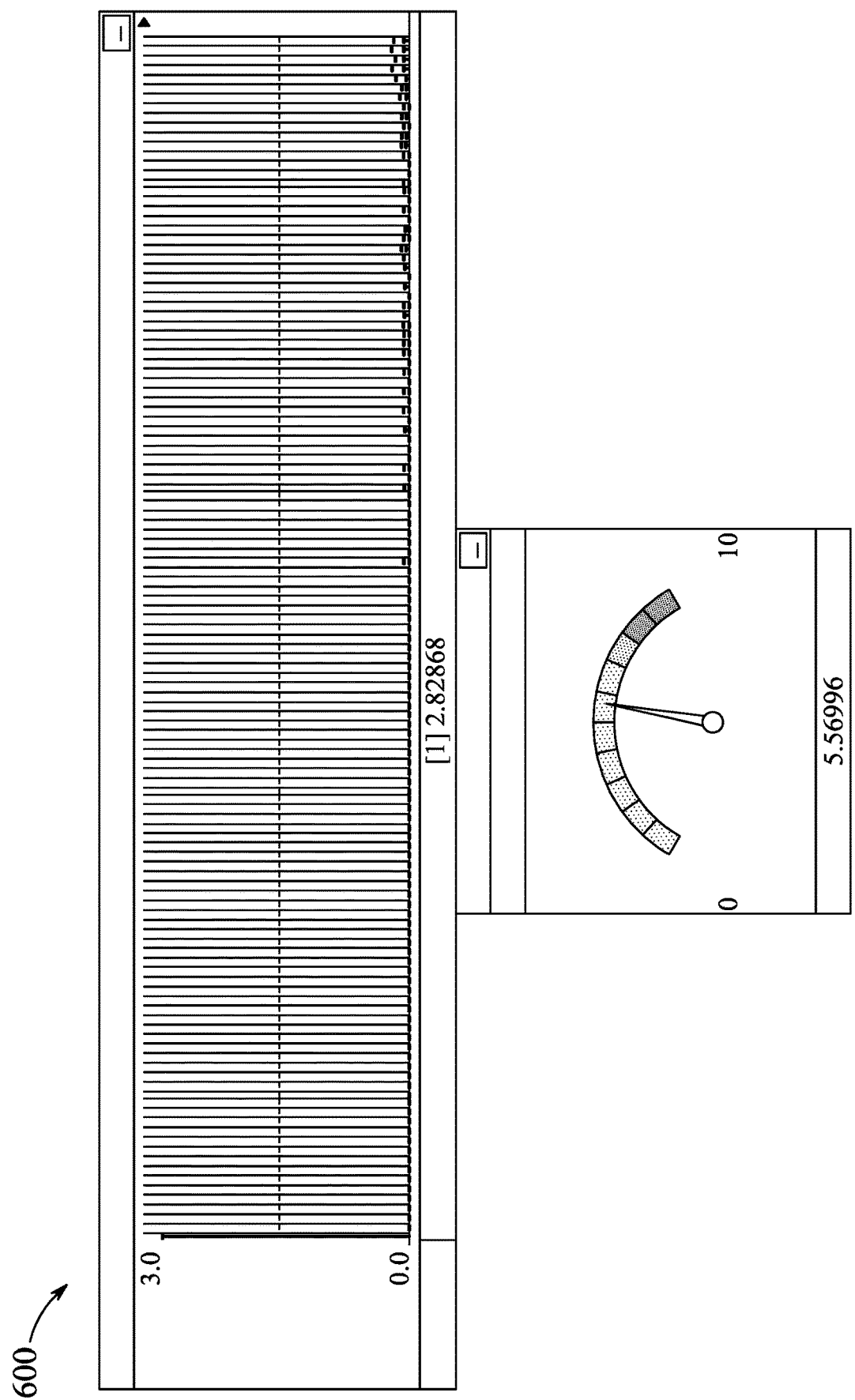
FIG. 6 is an illustration of a Fast Fourier Transform (FFT) of the output voltage waveform of the 15-level multilevel inverter circuit, according to exemplary aspects of the present disclosure.

FIG. 6 is an illustration 600 of a Fast Fourier Transform (FFT) of the output voltage waveform 500 of the 15-level multilevel inverter circuit 100, with the meter inset showing the Total Harmonic Distortion (THD) of the output waveform 500. In order to evaluate the performance of the 15-level multilevel inverter circuit 100, the Total Harmonic Distortion (THD) of the output waveform 500 may be evaluated. According to an aspect of the present disclosure, the THD may be calculated using the following equation.

$$THD = \frac{\sqrt{\left(\sum_{n=3,5,7,\ldots}^{\infty} b_n\right)}}{b_1} \quad (17)$$

where $b_n$ is obtained using the following equation.

$$b_n = \frac{4V_{dc}}{n\pi}\left[1 + \sum_{k=1}^{N_{levels}-2} \cos(n\alpha_i)\right] \text{ for } n \text{ odd} \quad (18)$$

The performance of the 15-level multilevel inverter circuit 100 and its modulation strategy was simulated using Power Systems Computer Aided Design (PSCAD) software.

The result of the simulation showed outputs with small total harmonics distortion that comply with the International Electrotechnical Commission (IEC) and IEEE standards. As can be seen on the meter inset, total harmonics distortion of the output voltage is about 5.5%. Further, the fundamental component is about 3.98 kV while the reference is 4 kV. Thus, losses in the harmonics are almost negligible.

Another measure of the performance of the 15-level multilevel inverter circuit 100 is the losses of the 15-level multilevel inverter circuit 100. Typically, there are two types of losses: the conduction loss and the switching loss.

The conduction loss is the loss incurred when a device is in full conduction. If, for example, IGBTs are used as switches in a multilevel inverter, then conduction losses of the IGBT are given by:

$$P_{c,IGBT}(t)=[V_{IGBT}+R_{IGBT}(t)i^\beta(t)]i(t) \quad (19)$$

$$P_{c,D}(t)=[V_D+R_D i(t)]i(t) \quad (20)$$

In the above equations 19 and 20, "$P_{c,IGBT}(t)$" represents IGBT conduction loss, "$P_{c,D}(t)$" represents diode conduction loss, "$V_{IGBT}$" represents forward voltage drop of the IGBT, "$V_D$" represents forward voltage drop of the diode, "$R_T$" represents equivalent resistance of the transistor, "$R_D$" represents equivalent resistance of the diode, and "β" represents a constant related to specification of the transistor.

If there are $N_{IGBT}$ number of IGBTs and $N_D$ number of diodes in a conduction path at a given time instant "t", then average power value of the multilevel inverter conduction power loss ($P_c$) is given by:

$$P_c = \frac{1}{2\pi} \int_0^{2\pi} [N_{IGBT}(t)P_{c,IGBT}(t) + N_D(t)P_{c,D}(t)]dt \quad (21)$$

Switching loss is the loss incurred as the switches transition from a full conduction to a zero conduction. Switching losses are associated with the turn-on and turn-off of the switches. By considering the linear variations of voltage and current of the switches during a switching period, turn-on ($E_{on,\,S}$) and turn-off ($E_{off,\,S}$), the energy losses of a switch S are given by:

$$E_{on,s} = \int_0^{t_{on}} v(t)i(t)dt = \frac{1}{6}V_{SW,S}I't_{on} \quad (22)$$

$$E_{off,s} = \int_0^{t_{off}} v(t)i(t)dt = \frac{1}{6}V_{SW,S}It_{off} \quad (23)$$

In the above equations, "I'" represents current through the switch after turning on, I represents current through the switch before turning off, and "$V_{SW,S}$" represents the off-state voltage on the switch.

Therefore, the switching power loss ($P_{sw}$) is:

$$P_{sw} = f\sum_{S=1}^{N_{switch}} \left(\sum_{i=1}^{N_{on,S}} E_{on,Si} + \sum_{i=1}^{N_{off,S}} E_{off,Si}\right) \quad (24)$$

In the above equations, "f" represents fundamental frequency, "$N_{on,S}$" and "$N_{off,S}$" represent the number of times the switch S turns-on and turns-off during a fundamental cycle, "$E_{onSi}$" represents the energy loss of the switch S during the $i^{th}$ turn-on, and "$E_{off,Si}$" represents the energy loss of the switch S during the $i^{th}$ turn-off.

Hence, the total multilevel inverter loss ($P_{Loss}$) is given by:

$$P_{LOSS}=P_c+P_{sw} \quad (25)$$

The inverter efficiency ($\eta$) is:

$$\eta = \frac{P_{out}}{P_{in}} = \frac{P_{out}}{P_{out}+P_{Loss}} \quad (26)$$

In the above equation, "$P_{out}$" represents output power of the multilevel inverter and "$P_{in}$" represents input power of the multilevel inverter.

Further, a comparison has been carried out between the 15-level multilevel inverter topology i.e., the Switched Capacitor Based Single Source (SCSS) topology and other conventional multilevel inverter topologies including Switched Series/Parallel Sources (SSPS) topology, Series Connected Switches Sources (SCSS) topology, Packed U Cell (PUC) topology, and Cascaded Bipolar Switched Cells (CBSC) topology.

Table 2 illustrates a comparison between the 15-level multilevel inverter topology and other conventional multilevel inverter topologies including SSPS, SCSS, PUC, and CBSC with respect to relationship of the number of switches $N_{switch}$ and the number of DC voltage supplies $N_{supply}$ with the number of output voltage levels $N_{levels}$, respectively.

TABLE 2

Comparison of the 15-L multilevel inverter topology with other multilevel inverters

| Topology | $N_{source}$ | $N_{switch}$ | $N_{variety}$ |
|---|---|---|---|
| SSPS | $\frac{N_{levels}}{2}$ | $\frac{3N_{levels}-6}{2}+4$ | 1 |
| SCSS | $\frac{N_{levels}-1}{2}$ | $N_{levels}+3$ | 1 |
| PUC | $\frac{N_{levels}+1}{4}$ | $\frac{N_{levels}+5}{2}$ | $\frac{N_{levels}+1}{4}$ |
| CBSC | $\frac{N_{levels}-1}{2}$ | $(N_{levels}+1)^*$ *Bidirectional switches | 1 |
| 15-level Multilevel Inverter Topology | $\frac{N_{levels}+1}{4}$ | $\frac{N_{levels}+11}{2}$ | 2 |

It is clear from Table 2 that the 15-level multilevel inverter topology is capable of producing a higher number of output voltage levels using fewer switches and DC voltage supplies/sources in comparison to other conventional topologies.

Figure 7A:
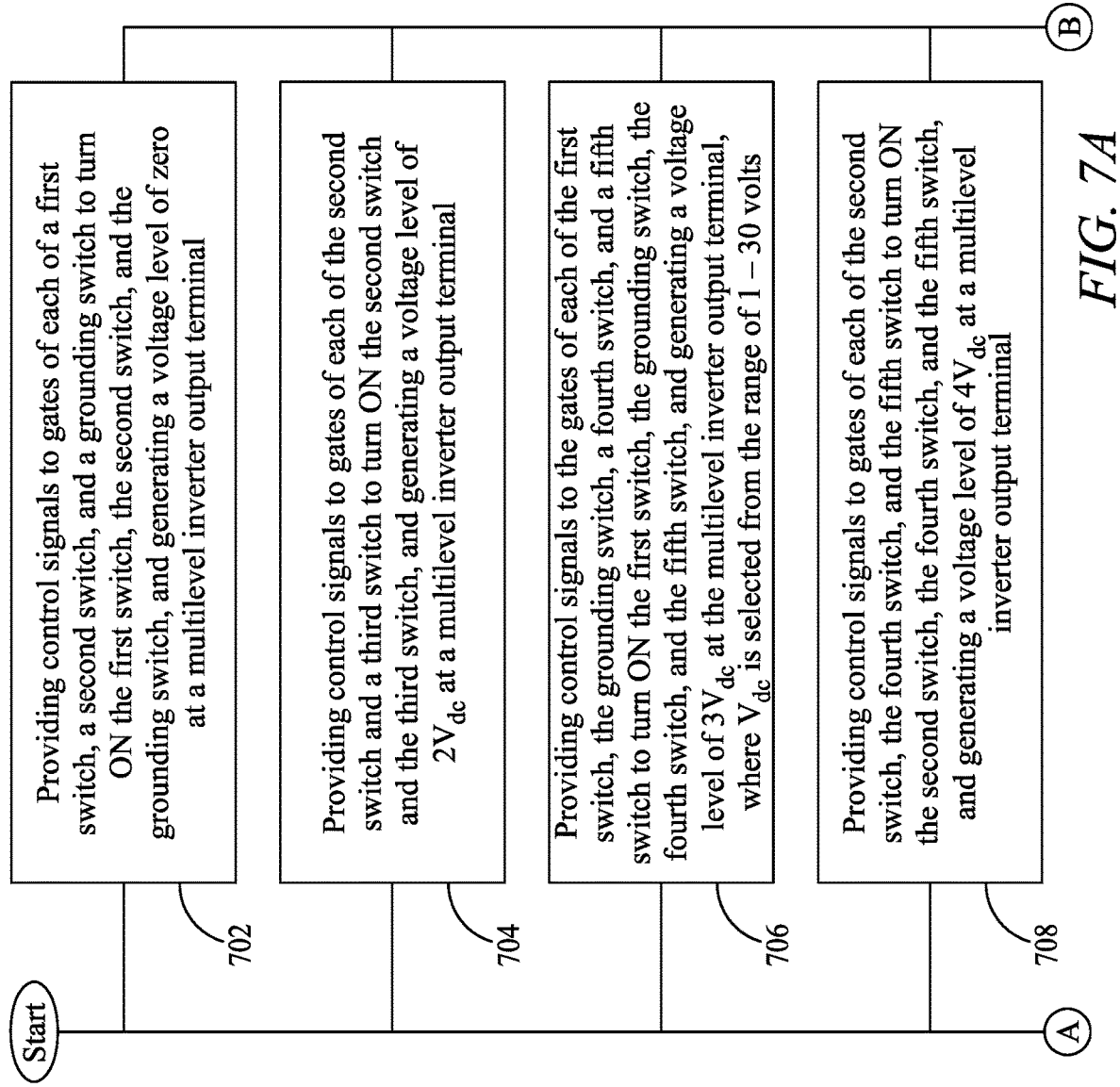
FIGS. 7A and 7B illustrate a flowchart of a method for controlling an output voltage at a multilevel inverter output terminal of a 15-level multilevel inverter, according to exemplary aspects of the present disclosure.
Figure 7B:
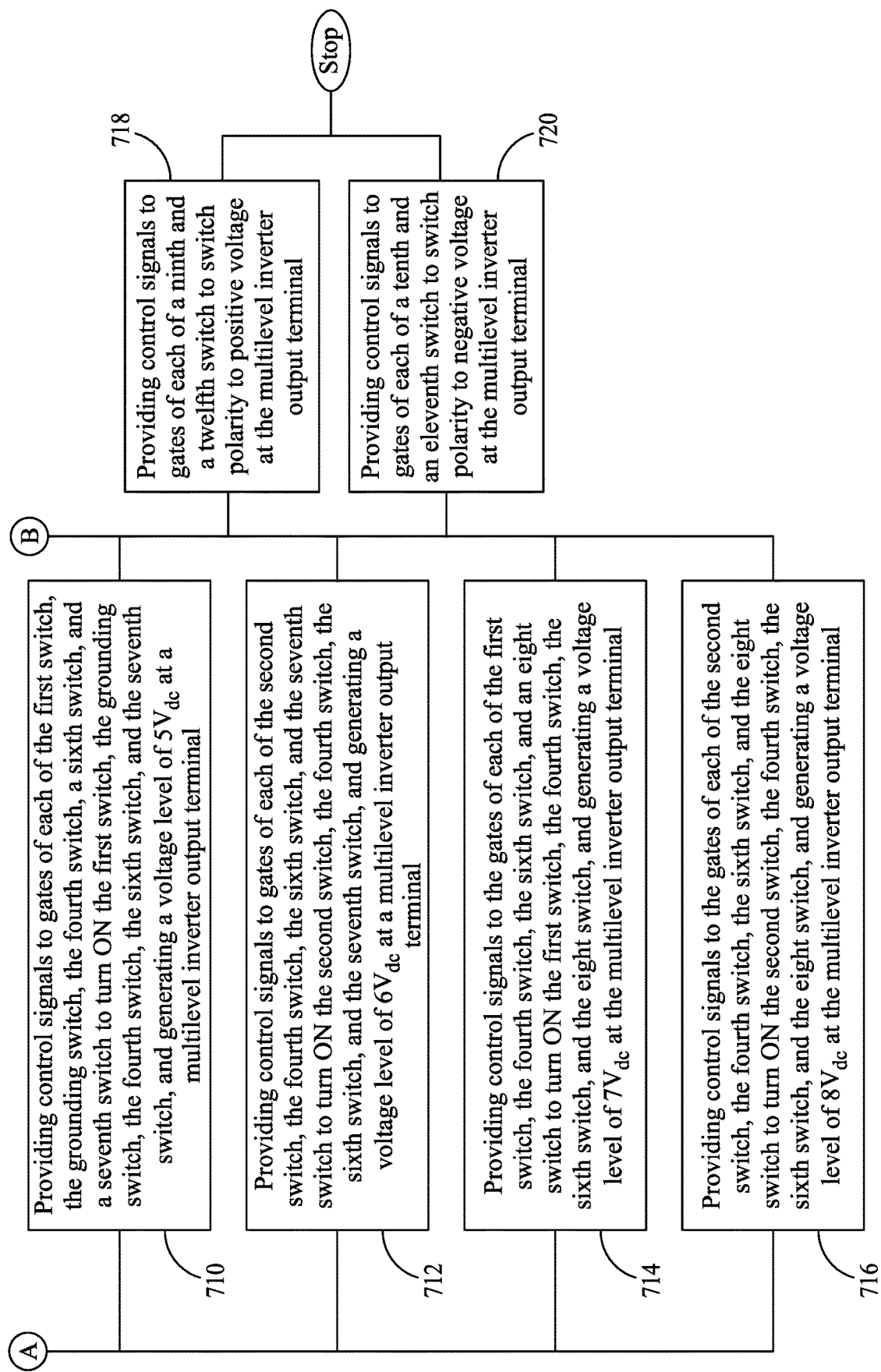

FIGS. 7A and 7B illustrate a flowchart of a method 700 for controlling an output voltage at the multilevel inverter output terminal 108 of the 15-level multilevel inverter 100, according to exemplary aspects of the present disclosure.

At step 702, the method 700 includes providing control signals to gates of each of a first switch ($S_1$), a second switch ($S_2$), and a grounding switch ($S_G$) to turn ON the first switch ($S_1$), the second switch, and the grounding switch ($S_G$), and generating a voltage level of zero at the multilevel inverter output terminal 108 of the 15-level multilevel inverter 100.

At step 704, the method 700 includes providing control signals to gates of each of the second switch ($S_2$) and a third switch ($S_3$) to turn ON the second switch ($S_2$) and the third switch ($S_3$), and generating a voltage level of $2V_{dc}$ at the multilevel inverter output terminal 108, where $V_{dc}$ is selected from the range of 1-30 volts.

At step 706, the method 700 includes providing control signals to the gates of each of the first switch ($S_1$), the grounding switch ($S_G$), a fourth switch ($S_4$), and a fifth switch ($S_5$) to turn ON the first switch ($S_1$), the grounding switch ($S_G$), the fourth switch ($S_4$), and the fifth switch ($S_5$), and generating a voltage level of $3V_{dc}$ at the multilevel inverter output terminal 108, where $V_{dc}$ is selected from the range of 1-30 volts.

At step 708, the method 700 includes providing control signals to the gates of each of the second switch ($S_2$), the fourth switch ($S_4$), and the fifth switch ($S_5$) to turn ON the second switch ($S_2$), the fourth switch ($S_4$), and the fifth switch ($S_5$), and generating a voltage level of $4V_{dc}$ at the multilevel inverter output terminal 108.

At step 710, the method 700 includes providing control signals to the gates of each of the first switch ($S_5$), the grounding switch ($S_G$), the fourth switch ($S_4$), a sixth switch ($S_6$), and a seventh switch ($S_7$) to turn ON the first switch ($S_5$), the grounding switch ($S_G$), the fourth switch ($S_4$), a sixth switch ($S_6$), and the seventh switch ($S_7$), and generating a voltage level of $5V_{dc}$ at the multilevel inverter output terminal 108.

At step 712, the method 700 includes providing control signals to the gates of each of the second switch ($S_2$), the fourth switch ($S_4$), the sixth switch ($S_6$), and the seventh switch ($S_7$) to turn ON the second switch ($S_2$), the fourth switch ($S_4$), the sixth switch ($S_6$), and the seventh switch ($S_7$), and generating a voltage level of $6V_{dc}$ at the multilevel inverter output terminal 108.

At step 714, the method 700 includes providing control signals to the gates of each of the first switch ($S_5$), the grounding switch ($S_G$), the fourth switch ($S_4$), a sixth switch ($S_6$), and an eight switch ($S_8$) to turn ON the first switch ($S_5$), the grounding switch ($S_G$), the fourth switch ($S_4$), a sixth switch ($S_6$), and the eight switch ($S_8$), and generating a voltage level of $7V_{dc}$ at the multilevel inverter output terminal 108.

At step 716, the method 700 includes providing control signals to the gates of each of the second switch ($S_2$), the fourth switch ($S_4$), the sixth switch ($S_6$), and the eight switch ($S_8$) to turn ON the second switch ($S_2$), the fourth switch ($S_4$), the sixth switch ($S_6$), and the eight switch ($S_8$), and generating a voltage level of $8V_{dc}$ at the multilevel inverter output terminal 108.

At step 718, the method 700 includes providing control signals to gates of each of a ninth and a twelfth switch to switch polarity to positive voltage at the multilevel output inverter terminal 108.

At step 720, the method 700 includes providing control signals to gates of each of a tenth and an eleventh switch to switch polarity to negative voltage at the multilevel inverter output terminal 108.

In some aspects of the present disclosure, control signals are provided to the unidirectional power switches by hybrid modulation. In an example, the hybrid modulation comprises providing the control signals to generate an output waveform of square wave blocks at the multilevel inverter output terminal 108 which approximates a sinusoidal reference wave, $v_{ref}$.

According to an aspect of the present disclosure, the sinusoidal reference wave is calculated by determining a number of square wave blocks per half-cycle, $B_{core}$, based on the equation (12) and determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on the equations (13) and (14), respectively. Further, according to an aspect of the present disclosure, the sinusoidal reference wave, $v_{ref}$, is determined based on the equation (15).

According to some aspects, the sinusoidal reference wave, $v_{ref}$, is modulated by two triangular carriers, Cr1 and Cr2. Further, a modulation index, m, for the sinusoidal reference wave, $v_{ref}$, is calculated based on the equation (16).

Further, in some aspects of the present disclosure, one of the steps 702, 704, 706, 708, 710, 712, 714, and 716 is performed together with either of the steps 718 and 720. In an example, the steps 702, 704, 706, 708, 710, 712, 714, and 716 are performed in a particular sequence (such as, one by one) in combination with either of the steps 718 and 720 such that 15 levels of DC output voltage levels are generated at the 15-level multilevel inverter circuit 100. For example, only steps 702 and 718 may be performed to generate a zero output voltage. In another example, only steps 704 and 718 may be performed to generate a voltage of $2V_{dc}$. In yet another example, only steps 704 and 720 may be performed to generate a voltage of $-2V_{dc}$, and so on. In some aspects of the present disclosure, each of the steps 702-716 may be performed independently for a desired voltage. The 15-level multilevel inverter circuit 100 described herein may be modified into a N-level multilevel inverter circuit by having "n" number cells in the inner circuit 104. The 15-level multilevel inverter circuit 100 as described above has three (3) cells. An N-level inverter may have more than 3 cells. The N-level multilevel inverter circuit is described in more detail in FIG. 8.

Figure 8:
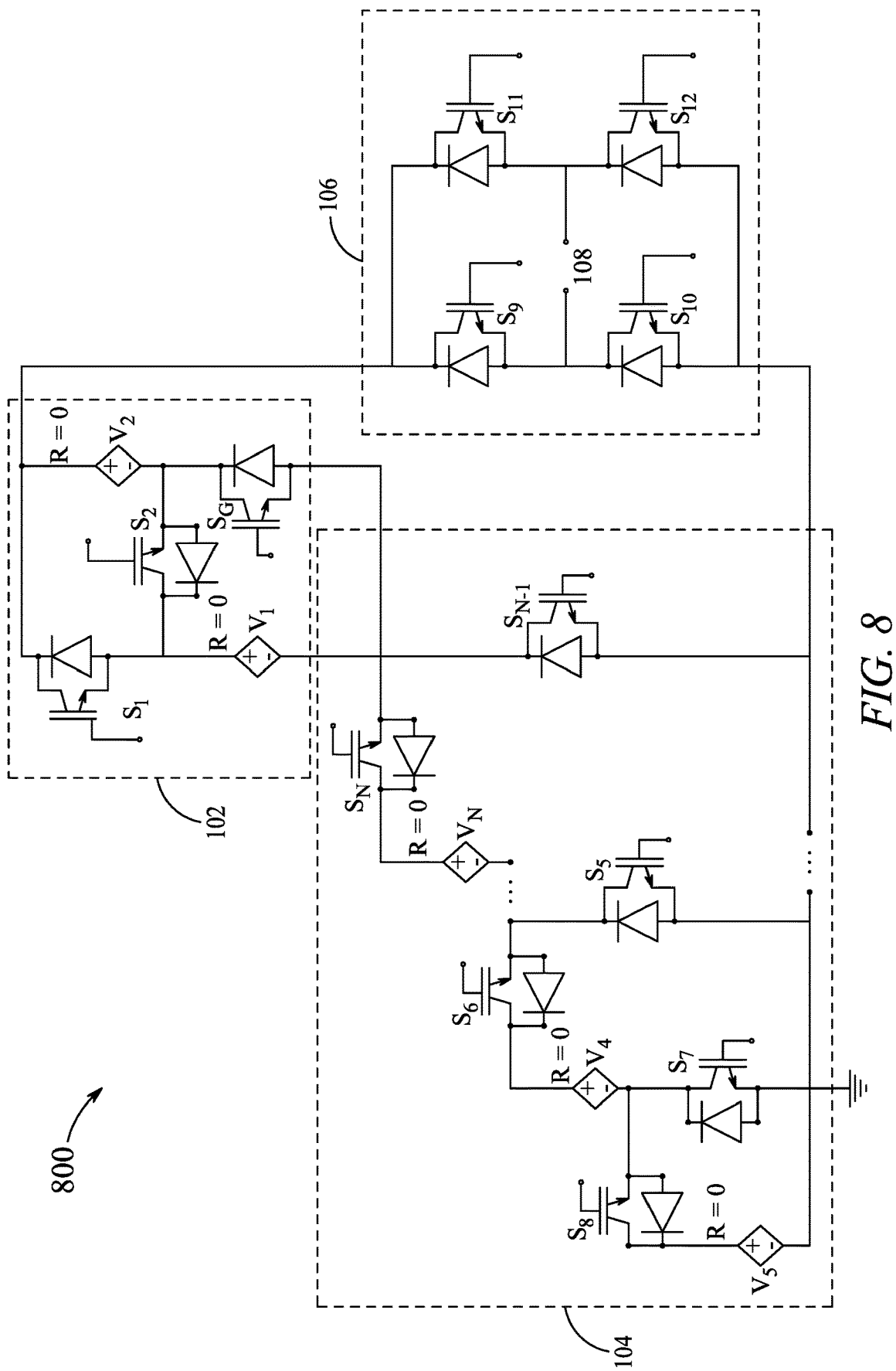
FIG. 8 illustrates an N-level multilevel inverter circuit, according to exemplary aspects of the present disclosure.

FIG. 8 illustrates an N-level multilevel inverter circuit 800, according to exemplary aspects of the present disclosure. As can be seen in FIG. 8, the N-level multilevel inverter circuit 800 includes the outer circuit 102, the inner circuit 104, the polarity changing circuit 106, and the multilevel output inverter terminal 108.

According to some aspects of the present disclosure, the outer circuit 102 may include a plurality of outer DC voltage supplies and a plurality of outer unidirectional power switches. For example, the outer circuit 102 includes two outer DC voltage supplies, namely a first voltage supply ($V_1$) and a second voltage supply ($V_2$), and three outer unidirectional power switches namely a first switch ($S_1$), a second switch ($S_2$), and a grounding switch ($S_G$). Further, the inner circuit 104 may include a plurality of inner DC voltage supplies and a plurality of inner unidirectional power switches. For example, as shown in FIG. 8, the inner circuit 104 includes at least three inner DC voltage supplies, namely a fourth voltage supply ($V_4$), and a fifth voltage supply ($V_5$) and a $N^{th}$ Supply ($V_N$). Further, the inner circuit 104 includes at least six inner unidirectional power switches namely a fifth switch ($S_5$), a sixth switch ($S_6$), seventh switch ($S_7$), an eight switch ($S_8$), $N-1^{th}$ switch ($S_{N-1}$) and $N^{th}$ switch ($S_N$). According to an aspect of the present disclosure, the inner circuit 104 may be built based on an interconnection of "n" number of cells, where n is an integer.

Each inner cell is formed by a voltage supply and two unidirectional power switches. For example, in FIG. 8, $V_5$, $S_7$ and $S_8$ form a first cell, $V_4$, $S_6$ and $S_5$ form a second cell, and $V_N$, $S_{N-1}$ and $S_N$ form a "$n^{th}$" cell. Between the second cell and the $n^{th}$ cell, there can be many switching cells interconnected to form the inner circuit 104.

The polarity changing circuit 106 may include a plurality of polarity changing unidirectional power switches arranged in an H-bridge formation. In some aspects of the present disclosure, the H-bridge formation of the polarity changing unidirectional power switches facilitates in achieving both positive and negative voltage levels at the multilevel inverter output terminal 108. For example, the polarity changing circuit 106 includes four polarity changing unidirectional power switches namely, a ninth switch ($S_9$), a tenth switch ($S_{10}$), an eleventh switch ($S_{11}$), and a twelfth switch ($S_{12}$).

According to an aspect of the present disclosure, the N-level multilevel inverter circuit 800 is capable of generating/producing a plurality of DC output voltage levels (interchangeably referred to as output voltage levels). In an example, a number of the output voltage levels generated by the N-level multilevel inverter circuit 800 may be determined using the following equation (27).

$$N_{levels} = 4n+3 \qquad (27)$$

In the above equation (27), "$N_{levels}$" represents the number of the output voltage levels generated by the N-level multilevel inverter circuit 800 and "n" represents the number of cells in the N-level multilevel inverter circuit 800.

In an aspect of the present disclosure, a number of DC voltage supplies (interchangeably referred to voltage supplies) and a number of unidirectional power switches (interchangeably referred to as switches) required for generation of the "$N_{levels}$" output voltage levels at the multilevel inverter output terminal 108 may be determined using below equations (28) and (29).

$$N_{switch} = 2n+7 \qquad (28)$$

$$N_{supply} = n+2 \qquad (29)$$

In the above equations (28) and (29), "$N_{switch}$" represents the number of unidirectional power switches and "$N_{supply}$" represents the number of DC voltage supplies.

Using the equation (27), the output voltage levels for a 15-level multilevel inverter circuit 100 are given by $N_{levels}=4n+3=15$, where n=the number of cells, that is 3 as seen in FIG. 1A. Further, using the equation (28), the number of switches for the 15-level multilevel inverter circuit 100 is given by $N_{switch}=2n+7=13$. Also, using the equation (29), the number of DC voltage supplies for the 15-level multilevel inverter circuit 100 may be derived as $N_{supply}=n+2=5$.

Further, maximum magnitude of the voltage generated at the multilevel inverter output terminal 108 may be determined using below equation (30).

$$V_{o,max} = \sum_{k=1}^{n-1} V_k = (2n+1)V_{dc} \qquad (30)$$

In the above equation (30), "$V_{o,max}$" represents maximum magnitude of the generated voltage.

Figure 9:
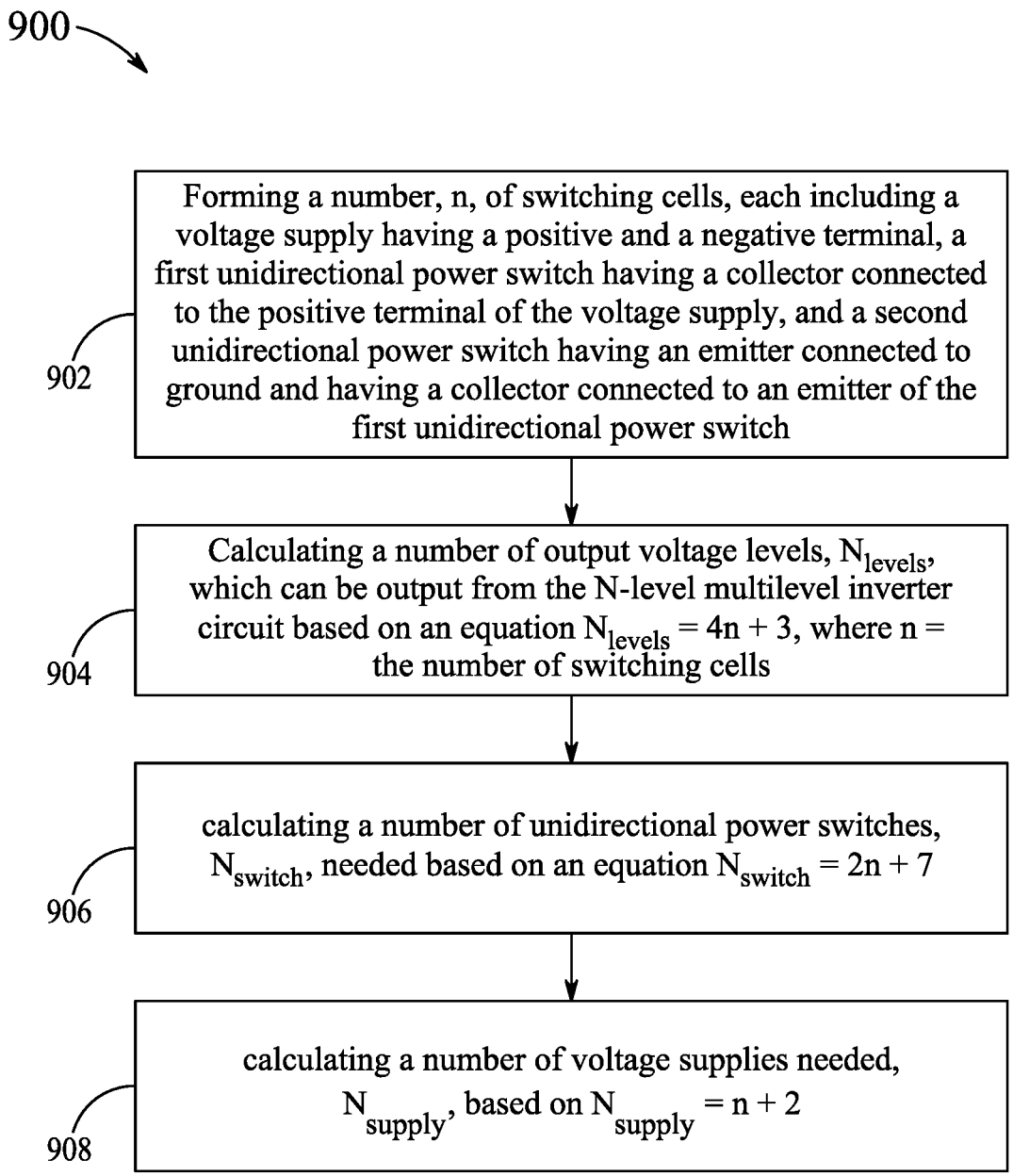
FIG. 9 is a flowchart of a method for designing an N-level multilevel inverter circuit, according to exemplary aspects of the present disclosure.

FIG. 9 is a flowchart of a method 900 for designing the N-level multilevel inverter circuit 800, according to exemplary aspects of the present disclosure.

At step 902, the method 900 includes forming a number, n, of switching cells, each switching cell including a voltage supply having a positive and a negative terminal, a first unidirectional power switch having a collector connected to the positive terminal of the voltage supply, and a second unidirectional power switch having an emitter connected to ground and having a collector connected to an emitter of the first unidirectional power switch. The voltage of the voltage supply of each switching cell is selected to be $2V_{dc}$, where $V_{dc}$ is chosen from a range of 1-30 volts. Further, a maximum value of an output voltage, $V_{o, max}$, at the multilevel inverter output terminal of the N-level multilevel inverter circuit 800 is calculated based on the equation (30).

At step 904, the method 900 includes calculating a number of output voltage levels, $N_{levels}$, which can be output from the N-level multilevel inverter circuit 800 based on the equation (27). According to an aspect of the present disclosure, the number of output voltage levels, $N_{level}$, is selected to be 15 for the 15-level multilevel inverter circuit 100 and as a result the number of cells required is determined to be n=3.

At step 906, the method 900 includes calculating a number of unidirectional power switches, $N_{switch}$, needed based on the equation (28). According to an aspect of the present disclosure, the number of unidirectional power switches, $N_{switch}$, is determined to be 13 for the 15-level multilevel inverter circuit 100.

At step 908, the method 900 includes calculating a number of voltage supplies needed, $N_{supply}$, based on the equation (29). According to aspect of the present disclosure, the number of voltage supplies required, $N_{supply}$, is calculated to be $N_{supply}$=5 for the 15-level multilevel inverter circuit 100. According to an aspect of the present disclosure, the inner circuit 104 including three switching cells is formed. The first switching cell is formed by the fifth voltage supply ($V_5$), the seventh switch ($S_7$), and an eighth switch ($S_8$). The second switching cell is formed by the fourth voltage supply ($V_4$), the fifth switch ($S_5$), and the sixth switch ($S_6$). Further, the third switching cell is formed by the third voltage supply ($V_3$), the fourth switch ($S_4$), and the third switch ($S_3$).

According to some aspects of the present disclosure, the outer circuit 102 is formed. The outer circuit 102 includes the first switch ($S_1$), the second switch ($S_2$), the grounding switch ($S_G$), the first voltage supply ($V_1$), and the second voltage supply ($V_2$). In an example, value of each of voltages of $V_1$ and $V_2$ is $V_{dc}$. Further, in an aspect of the present disclosure, the polarity changing circuit 106 is formed. The polarity changing circuit 106 includes the ninth switch ($S_9$), the tenth switch ($S_{10}$), the eleventh switch ($S_{11}$), and the twelfth switch ($S_{12}$) arranged in an H-bridge configuration about the multilevel inverter output terminal 108. Further, the voltage at the multilevel inverter output terminal 108 is positive when $S_9$ and $S_{12}$ are ON and $S_{10}$ and $S_{11}$ are OFF, and the voltage at the multilevel inverter output terminal 108 is negative when $S_9$ and $S_{12}$ are OFF and $S_{10}$ and $S_{11}$ are ON.

In some aspects of the present disclosure, control signals are provided to the unidirectional power switches by hybrid modulation. In an example, the hybrid modulation includes providing the control signals to generate an output waveform of square wave blocks at the multilevel inverter output terminal 108 which approximates a sinusoidal reference wave, $v_{ref}$. In some aspects of the present disclosure, the sinusoidal reference wave is calculated by determining a number of square wave blocks per half-cycle, $N_{core}$, based on the equation (12) and determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on the equations (13) and (14), respectively. Further, in an aspect of the present disclosure, the sinusoidal reference wave, $v_{ref}$ is determined based on the equation (15). In an aspect of the present disclosure, the sinusoidal reference wave, $v_{ref}$ is modulated by two triangular carriers, Cr1 and Cr2. Further, a modulation index, in, for the sinusoidal reference wave, $v_{ref}$ is calculated based on the equation (16).

The first embodiment is illustrated with respect to FIGS. 1-13. The first embodiment describes a 15-level multilevel inverter, comprising an outer circuit including a plurality of outer direct current (DC) voltage supplies, each outer DC voltage supply having a positive and a negative terminal, a plurality of outer unidirectional power switches, each outer unidirectional power switch having an emitter, a collector, and a gate, wherein each outer unidirectional power switch is in parallel with a diode, an inner circuit including a plurality of inner DC voltage supplies, each inner DC voltage supply having a positive and a negative terminal, a plurality of inner unidirectional power switches, each inner unidirectional power switch having an emitter, a collector, and a gate, wherein each unidirectional power switch is in parallel with a diode, a polarity changing circuit including four polarity changing unidirectional power switches arranged in an H-bridge formation, each polarity changing unidirectional power switch having a emitter, a collector and a gate, wherein each polarity changing unidirectional power switch is in parallel with a diode, a multilevel inverter output terminal, a computing device including processing circuitry and program instructions configured to provide control signals to the gates of the plurality of outer unidirectional power switches of the outer circuit to switch the plurality of outer DC voltage supplies of the outer circuit to form square waveforms which approximate sinusoidal waveforms, provide control signals to the gates of the plurality of the inner unidirectional power switches of the inner circuit to add or subtract each of the inner DC voltage supplies with a voltage at the multilevel inverter output terminal, provide control signals to the gates of the polarity changing unidirectional power switches to switch the polarity of the voltage at the multilevel inverter output terminal.

The plurality of outer DC voltage supplies includes a first voltage supply and a second voltage supply, wherein the plurality of outer unidirectional power switches includes a first switch, a second switch, and a grounding switch, wherein the positive terminal of the first voltage supply is connected to the emitter of the first switch which blocks the first voltage supply when ON and passes the first voltage supply to the polarity changing circuit when OFF, wherein the positive terminal of the first voltage supply is connected to the collector of the second switch which passes the first voltage supply to the polarity changing circuit when ON and blocks the first voltage supply when OFF, wherein the negative terminal of the second voltage supply is connected to the emitter of the second switch and the positive terminal is connected to the polarity changing circuit and wherein the collector of the grounding switch is connected to the negative terminal of the second voltage supply, wherein the grounding switch adds the first voltage supply to the second voltage supply when OFF and disconnects the first voltage supply from the second voltage supply when ON.

The plurality of inner DC voltage supplies includes a third voltage supply, a fourth voltage supply, and a fifth voltage supply, wherein the plurality of inner unidirectional power switches includes a third, a fourth, a fifth, a sixth, a seventh, and an eighth switch, wherein the collector of the third switch is connected to the negative terminal of the first voltage supply and the emitter of the third switch is connected to ground, wherein the third switch disconnects the inner circuit from the outer circuit when ON, wherein the collector of the fourth switch is connected to the positive terminal of the third voltage supply and the emitter of the fourth switch is connected to the negative terminal of the first voltage supply, wherein the third voltage supply adds to the voltage at the multilevel inverter output terminal when the fourth switch is ON and the first switch and third switch are OFF. The collector of the fifth switch is connected to the negative terminal of the third voltage supply and the emitter of the fifth switch is connected to ground, wherein the fifth switch grounds the third voltage supply when ON, wherein the emitter of the sixth switch is connected to the negative terminal of the third voltage supply and collector of the sixth switch is connected to the positive terminal of the fourth voltage supply, wherein the sixth switch adds the fourth voltage supply to the third voltage supply when ON and disconnects the fourth voltage supply from the inner circuit when OFF, wherein the collector of the seventh switch is connected to the negative terminal of the fourth voltage supply and the emitter of the seventh switch is connected to ground, wherein the seventh switch disconnects the fifth voltage supply from the inner circuit and adds the fourth voltage supply when ON and adds the fifth voltage supply to the fourth voltage supply when the eighth switch is ON and the seventh switch is OFF, wherein the positive terminal of the fifth voltage supply is connected to the collector of the eighth switch and the negative terminal is connected to ground and wherein the emitter of the eighth switch is further connected to the negative terminal of the fourth voltage supply, wherein the eighth switch disconnects the fifth voltage supply from the fourth voltage supply when OFF and adds the fifth voltage supply to the fourth voltage supply when ON.

The polarity changing circuit includes a ninth, a tenth, an eleventh, and a twelfth switch, wherein the collectors of the ninth and eleventh switches are connected to the positive terminal of the second voltage supply and the emitters of the ninth and eleventh switches are connected to the multilevel inverter output terminal and the collectors of the tenth and twelfth switches are connected to the multilevel inverter output terminal and the emitters of the tenth and eleventh switches are connected to ground, wherein the voltage at the multilevel inverter output terminal is positive when the ninth and twelfth switches are ON and the tenth and eleventh switches are OFF, and wherein the voltage at the multilevel inverter output terminal is negative when the ninth and twelfth switches are OFF and the tenth and eleventh switches are ON.

The voltage of the first voltage supply is $V_1$, the voltage of the second voltage supply is $V_2$, wherein $V_1=V_2=V_{dc}$, where $V_{dc}$ is selected from the range of 1-30 volts.

The voltage of the third voltage supply is $V_3$, the voltage of the fourth voltage supply is $V_4$ and the voltage of the fifth voltage supply is $V_5$, wherein $V_3=V_4=V_5=2V_{dc}$.

The computing device is configured to provide control signals to the gates of the first, second, and grounding switches to generate a zero output voltage at the multilevel inverter output terminal, or to the gates of the second and third switches to generate a voltage of $2V_{dc}$ at the multilevel inverter output terminal, to the gates of the first, grounding, fourth and fifth switches to generate a voltage of $3V_{dc}$ at the multilevel inverter output terminal, or to the gates of the second, fourth, and fifth switches to generate a voltage of $4V_{dc}$ at the multilevel inverter output terminal, or to the gates of the first, grounding, fourth, sixth and seventh switches to generate a voltage of $5V_{dc}$ at the multilevel inverter output terminal, or to the gates of the second, fourth, sixth and, seventh switches to generate a voltage of $6V_{dc}$ at the multilevel inverter output terminal, or to the gates of the first, grounding, fourth, sixth, and eighth switches to generate a voltage of $7V_{dc}$ at the multilevel inverter output terminal, or to the gates of the second, fourth, sixth, and eighth switches to generate a voltage of $8V_{dc}$ at the multilevel inverter output terminal, and to the gates of the ninth, tenth, eleventh, and twelfth switches to switch the polarity of the voltage at the multilevel inverter output terminal between positive and negative.

The inner circuit comprises three cells, wherein the first cell is formed by the fifth voltage supply and the seventh and eighth switches, the second cell is formed by the fourth voltage supply and the fifth and sixth switches, and the third cell is formed by the third voltage supply and the fourth switch and the third switch, wherein the 15 output voltage levels of the 15-level multilevel inverter circuit are given by $N_{levels}=15=4n+3$, where n=the number of cells, wherein the number of switches is given by $N_{switch}=13=2n+7$, and wherein the number of voltage supplies is given by $N_{supply}=5\ n+2$.

Each unidirectional power switch is an integrated gate bipolar transistor (IGBT) in parallel with a diode with polarity opposite the polarity of the IGBT.

The computing device is configured to provide control signals to the unidirectional power switches by hybrid modulation.

The second embodiment is illustrated with respect to FIGS. 1-13. The second embodiment describes a method for controlling an output voltage at a multilevel inverter output terminal of a 15-level multilevel inverter. The 15-level multilevel inverter includes five voltage supplies and thirteen unidirectional power switches, wherein each unidirectional power switch is turned ON by providing a control signal to a gate of the unidirectional power switch. The method comprises providing control signals to the gates of each of a first switch, a second switch, and a grounding switch to turn ON the first switch, the second switch, and the grounding switch, and generate a voltage level of zero at the multilevel inverter output terminal, or providing control signals to the gates of each of a second switch and a third switch to turn ON the second switch and the third switch and generate a voltage level of $2V_{dc}$ at the multilevel inverter output terminal, where $V_{dc}$ is selected from the range of 1-30 volts, or providing control signals to the gates of each of a first switch, a grounding switch, a fourth switch, and a fifth switch to turn ON the first switch, the grounding switch, the fourth switch, and the fifth switch and generate a voltage level of $3V_{dc}$ at the multilevel inverter output terminal, where $V_{dc}$ is selected from the range of 1-30 volts, or providing control signals to the gates of each of a second switch, a fourth switch and a fifth switch to turn ON the second switch, the fourth switch and the fifth switch and generate a voltage level of $4V_{dc}$ at the multilevel inverter output terminal, or providing control signals to the gates of each of a first switch, a fourth switch, a sixth switch, and a seventh switch to turn ON the first switch, the fourth switch, the sixth switch, and the seventh switch, and generate a voltage level of $5V_{dc}$ at the multilevel output inverter terminal, or providing control signals to the gates of each of a second switch, a fourth switch, a sixth switch and a seventh switch to turn ON the second switch, the fourth switch, the sixth switch and the seventh switch and generate a voltage level of $6V_{dc}$ at the multilevel inverter output terminal, or providing control signals to the gates of each of a first switch, a fourth switch, and a seventh switch to turn ON the first switch, the fourth switch, and the seventh switch, and generate a voltage level of $7V_{dc}$ at the multilevel inverter output terminal, or providing control signals to the gates of each of a second switch, a fourth switch and a seventh switch to turn ON the second switch, the fourth switch and the seventh switch and generate a voltage level of $8V_{dc}$ at the multilevel inverter output terminal, and providing control signals to the gates of each of a ninth and twelfth switch to switch the polarity to positive voltage at the multilevel inverter output terminal, or providing control signals to the gates of each of a tenth and an eleventh switch to switch polarity to negative voltage at the multilevel output terminal.

The method comprises providing the control signals to the unidirectional power switches by hybrid modulation.

The hybrid modulation comprises providing the control signals to generate an output waveform of square wave blocks at the multilevel inverter output terminal which approximates a sinusoidal reference wave, $v_{ref}$, wherein $v_{ref}$ is calculated by determining a number of square wave blocks per half-cycle, $N_{core}$, based on $N_{core}=n-1$, determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on $$V_{core} = \frac{1}{N_{core}+0.5}, T_{core} = 4N_{core},$$

and determining $v_{ref}$ based on, $$v_{ref} = V_1 \sin(2\pi ft) - V_{core}\left[\sum_{i=1,3,5,\ldots}^{\frac{T_{core}}{2}-1} u(t-t_i) - u(t-t_{i+T_{core}}) + \sum_{j=2,4,6,\ldots}^{\frac{T_{core}}{2}-2} u(t-t_{T_{core}-j}) - u(t-t_{2T_{core}-j})\right],$$

where u(t) is a magnitude of a control signal.

The hybrid modulation further comprises modulating $v_{ref}$ by two triangular carriers, Cr1 and Cr2, and calculating a modulation index, m, based on $$m = \frac{v_{ref}}{Cr1,2 \text{ (peak)}},$$

where $0 \leq m \leq 1$.

The third embodiment is illustrated with respect to FIGS. 1-13. The third embodiment describes a method for designing an N-level multilevel inverter circuit, comprising forming a number, n, of switching cells, each switching cell including a voltage supply having a positive and a negative terminal, a first unidirectional power switch having a collector connected to the positive terminal of the voltage supply, and a second unidirectional power switch having an emitter connected to ground and having a collector connected to an emitter of the first unidirectional power switch, calculating a number of output voltage levels, $N_{levels}$, which can be output from the N-level multilevel inverter circuit based on an equation $N_{levels}=4n+3$, calculating a number of unidirectional power switches, $N_{switch}$, needed based on an equation $N_{switch}=2n+7$, and calculating a number of voltage supplies needed, $N_{supply}$, based on $N_{supply}=n+2$.

The method for designing further comprises selecting voltage of the voltage supply of each switching cell to be $2V_{dc}$, where $V_{dc}$ is chosen from a range of 1-30 volts, and calculating a maximum value of an output voltage, $V_{o,max}$, at a multilevel inverter output terminal based on an equation: $V_{o,max}=2(n+1)V_{dc}$.

The method for designing further comprises selecting the number of output voltage levels, $N_{levels}$, to be equal to 15 and calculating that n=3, $N_{switch}=13$ and $N_{supply}=5$, forming an inner circuit including three switching cells, wherein the first switching cell is formed by a fifth voltage supply and a seventh and an eighth switch, the second switching cell is formed by a fourth voltage supply and a fifth and a sixth switch, and the third switching cell is formed by a third voltage supply and a fourth switch and a third switch, forming an outer circuit including a first and a second switch, and a grounding switch, a first voltage supply and a second voltage supply, wherein value of each of voltages of the first voltage supply and second voltage supply is $V_{dc}$, forming a polarity changing circuit including a ninth, a tenth, an eleventh and a twelfth switch arranged in an H-bridge configuration about the multilevel inverter output terminal, wherein the voltage at the multilevel inverter output terminal is positive when the ninth and twelfth switches are ON and the tenth and eleventh switches are OFF and the voltage at the multilevel inverter output terminal is negative when the ninth and twelfth switches are OFF and the tenth and eleventh switches are ON.

The method for designing further comprises providing control signals to the unidirectional power switches by hybrid modulation.

The hybrid modulation comprises providing control signals to generate an output waveform of square wave blocks at the multilevel inverter output terminal which approximates a sinusoidal reference wave, $v_{ref}$, wherein $v_{ref}$ is calculated by determining a number of square wave blocks per half-cycle, $N_{core}$, based on $N_{core}=n-1$, determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on $$V_{core} = \frac{1}{N_{core}+0.5} \; T_{core} = 4N_{core},$$

and determining $v_{ref}$ based on $$v_{ref} = V_1 \sin(2\pi ft) - V_{core}\left[\sum_{i=1,3,5,\ldots}^{\frac{T_{core}}{2}-1} u(t-t_i) - u(t-t_{i+T_{core}}) + \sum_{j=2,4,6,\ldots}^{\frac{T_{core}}{2}-2} u(t-t_{T_{core}-j}) - u(t-t_{2T_{core}-j})\right],$$

where u(t) is a magnitude of a control signal.

The hybrid modulation further comprises modulating $v_{ref}$ by two triangular carriers, Cr1 and Cr2, and calculating a modulation index, m, based on $$m = \frac{v_{ref}}{Cr1,2 \text{ (peak)}},$$

where $0 \leq m \leq 1$.

Figure 10:
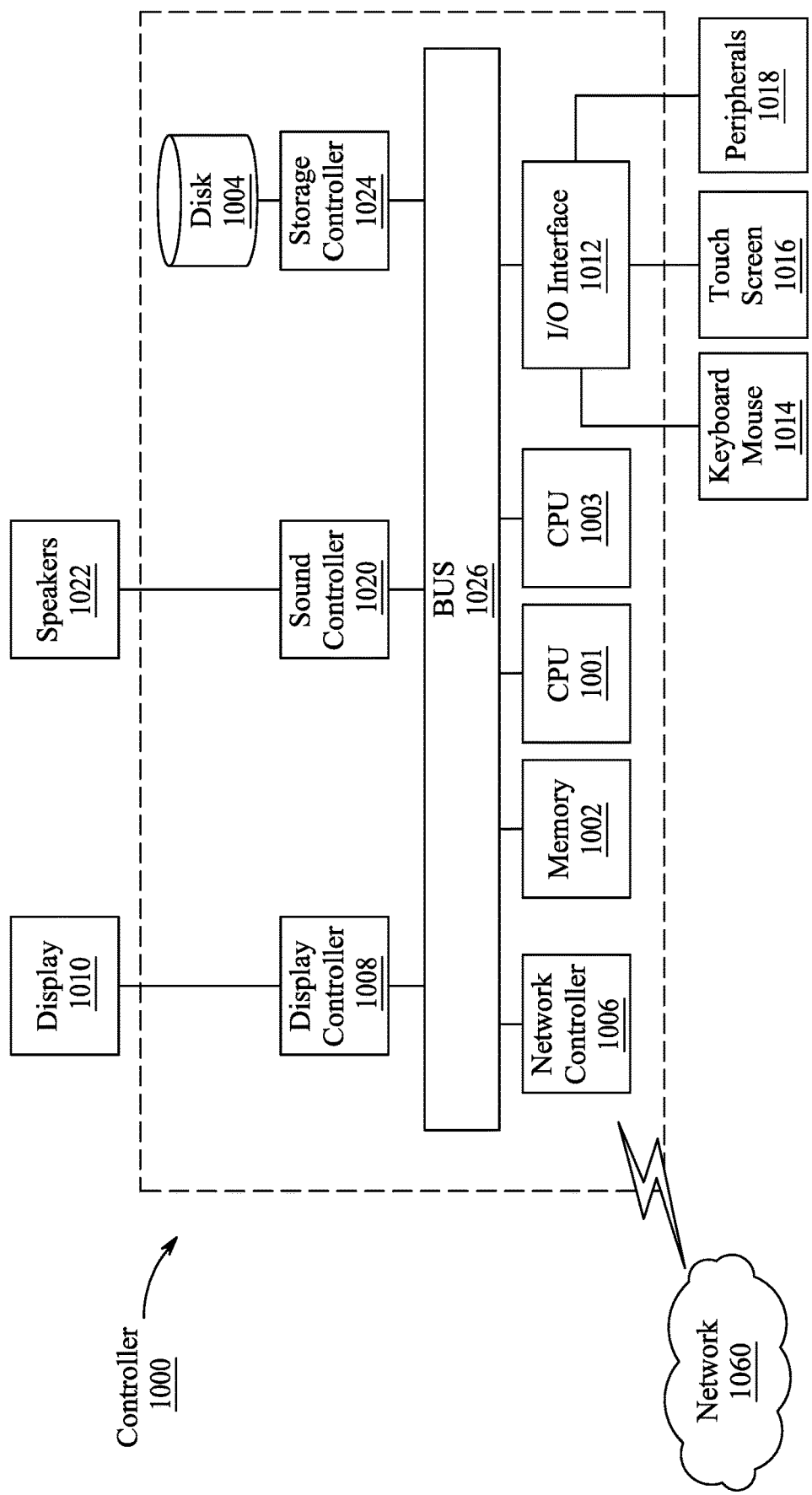
FIG. 10 is an illustration of a non-limiting example of details of computing hardware used in the computing system, according to exemplary aspects of the present disclosure.

FIG. 10 is an illustration of a non-limiting example of details of computing hardware used in the computing system, according to exemplary aspects of the present disclosure. In FIG. 10, a controller 1000 is described which is a computing device and includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

FIG. 11 shows a schematic diagram of a data processing system 1080 used within the computing system, according to exemplary aspects of the present disclosure. The data processing system 1080 is an example of a computer in which code or instructions implementing the processes of the illustrative aspects of the present disclosure may be located.

In FIG. 11, data processing system 1080 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

For example, FIG. 12 shows one aspects of the present disclosure of CPU 1230. In one aspects of the present disclosure, the instruction register 1238 retrieves instructions from the fast memory 1240. At least part of these instructions is fetched from the instruction register 1238 by the control logic 1236 and interpreted according to the instruction set architecture of the CPU 1130. Part of the instructions can also be directed to the register 1232. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1080 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
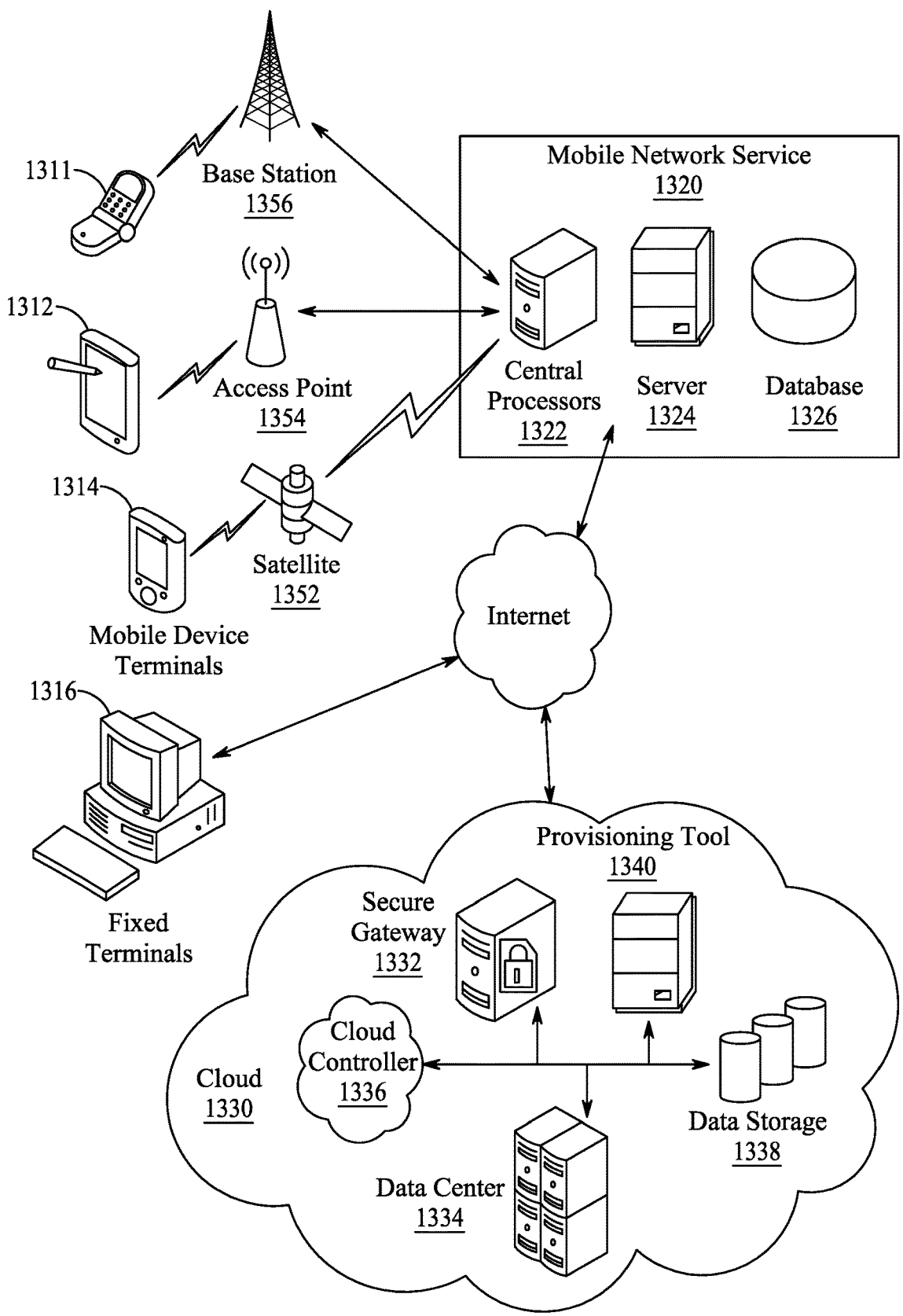
FIG. 13 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for controlling an output voltage at a multilevel inverter output terminal of a 15-level multilevel inverter, the 15-level multilevel inverter including five voltage supplies and thirteen unidirectional power switches, wherein each unidirectional power switch is turned ON by providing a control signal to a gate of the unidirectional power switch, comprising:

providing control signals to the gates of each of a first switch, a second switch, and a grounding switch to turn ON the first switch, the second switch, and, the grounding switch, and generate a voltage level of zero at the multilevel inverter output terminal; or providing control signals to the gates of each of the second switch and a third switch to turn ON the second switch and the third switch, and generate a voltage level of $2V_{dc}$ at the multilevel inverter output terminal, where $V_{dc}$ is selected from the range of 1-30 volts; or providing control signals to the gates of each of the first switch, the grounding switch, a fourth switch, and a fifth switch to turn ON the first switch, the grounding switch, the fourth switch, and the fifth switch, and generate a voltage level of $3V_{dc}$ at the multilevel inverter output terminal, where $V_{dc}$ is selected from the range of 1-30 volts; or providing control signals to the gates of each of the second switch, the fourth switch, and the fifth switch to turn ON the second switch, the fourth switch, and the fifth switch, and generate a voltage level of $4V_{dc}$ at the multilevel inverter output terminal; or providing control signals to the gates of each of the first switch, the grounding switch, the fourth switch, a sixth switch, and a seventh switch to turn ON the first switch, the grounding switch, the fourth switch, the sixth switch, and the seventh switch, and generate a voltage level of $5V_{dc}$ at the multilevel inverter output terminal; or providing control signals to the gates of each of the second switch, the fourth switch, the sixth switch, and the seventh switch to turn ON the second switch, the fourth switch, the sixth switch and, the seventh switch, and generate a voltage level of $6V_{dc}$ at the multilevel inverter output terminal; or providing control signals to the gates of each of the first switch, the grounding switch, the fourth switch, the sixth switch, and an eighth switch to turn ON the first switch, the grounding switch, the fourth switch, the sixth switch, and the eighth switch, and generate a voltage level of $7V_{dc}$ at the multilevel inverter output terminal; or providing control signals to the gates of each of the second switch, the fourth switch, the sixth switch, and the eighth switch to turn ON the second switch, the fourth switch, and the seventh switch, and generate a voltage level of $8V_{dc}$ at the multilevel inverter output terminal; and providing control signals to the gates of each of a ninth and a twelfth switch to switch polarity to positive voltage at the multilevel output inverter terminal; or providing control signals to the gates of each of a tenth and an eleventh switch to switch the polarity to negative voltage at the multilevel inverter output terminal.

2. The method of claim 1, further comprising:

providing the control signals to the unidirectional power switches by hybrid modulation.

3. The method of claim 2, wherein the hybrid modulation further comprises:

providing the control signals to generate an output waveform of square wave blocks at the multilevel inverter output terminal which approximates a sinusoidal reference wave, $v_{ref}$, wherein $v_{ref}$ is calculated by;

determining a number of square wave blocks per half-cycle, $N_{core}$, based on $N_{core}=n-1$;

determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on:

$$V_{core} = \frac{1}{N_{core} + 0.5}$$

$$T_{core} = 4N_{core};$$

and
determining $v_{ref}$ based on;

$$v_{ref} = V_1 \sin(2\pi ft) - V_{core}\left[\sum_{i=1,3,5,...}^{\frac{T_{core}}{2}-1} u(t - t_i) - u(t - t_{i+T_{core}}) + \sum_{j=2,4,6,...}^{\frac{T_{core}}{2}-2} u(t - t_{T_{core}-j}) - u(t - t_{2T_{core}-j})\right],$$

where u(t) is a magnitude of a control signal.

4. The method of claim 3, the hybrid modulation further comprising:
modulating $v_{ref}$ two triangular carriers, Cr1 and Cr2; and calculating a modulation index, m, based on:

$$m = \frac{v_{ref}}{Cr1,2 \text{ (peak)}},$$

where $0 \leq m \leq 1$.

5. A method for designing an N-level multilevel inverter circuit, comprising:
forming a number, n, of switching cells, each switching cell including a voltage supply having a positive and a negative terminal, a first unidirectional power switch having a collector connected to the positive terminal of the voltage supply, and a second unidirectional power switch having an emitter connected to ground and having a collector connected to an emitter of the first unidirectional power switch;
calculating a number of output voltage levels, $N_{levels}$, which can be output from the N-level multilevel inverter circuit based on an equation $N_{levels}=4n+3$;
calculating a number of unidirectional power switches, $N_{switch}$, needed based on an equation $N_{switch}=2n+7$; and
calculating a number of voltage supplies needed, $N_{supply}$, based on $N_{supply}=n+2$;
selecting voltage of the voltage supply of each switching cell to be $2V_{dc}$, where $V_{dc}$ is chosen from a range of 1-30 volts; and
calculating a maximum value of an output voltage, $V_{o,max}$, at a multilevel inverter output terminal based on an equation: $V_{o,max}=2(n+1)V_{dc}$;
selecting the number of output voltage levels, $N_{levels}$, to be equal to 15 and calculating that n=3, $N_{switch}=13$ and $N_{supply}=5$;
forming an inner circuit including three switching cells, wherein the first switching cell is formed by a fifth voltage supply and a seventh and an eighth switch, the second switching cell is formed by a fourth voltage supply and a fifth and a sixth switch, and the third switching cell is formed by a third voltage supply and a fourth switch and a third switch;
forming an outer circuit including a first and a second switch, and a grounding switch, a first voltage supply and a second voltage supply, wherein value of each of voltages of the first voltage supply and second voltage supply is $V_{dc}$;
forming a polarity changing circuit including a ninth, a tenth, an eleventh and a twelfth switch arranged in an H-bridge configuration about the multilevel inverter output terminal, wherein the voltage at the multilevel inverter output terminal is positive when the ninth and twelfth switches are ON and the tenth and eleventh switches are OFF and the voltage at the multilevel inverter output terminal is negative when the ninth and twelfth switches are OFF and the tenth and eleventh switches are ON.

6. The method of claim 5, further comprising:
providing control signals to the unidirectional power switches by hybrid modulation.

7. The method of claim 6, wherein the hybrid modulation further comprises:
providing control signals to generate an output waveform of square wave blocks at the multilevel inverter output terminal which approximates a sinusoidal reference wave, $v_{ref}$, wherein $v_{ref}$ is calculated by:
determining a number of square wave blocks per half-cycle, $N_{core}$, based on $N_{core}=n-1$;
determining a peak of the square wave blocks, $V_{core}$, and a number of starts and ends of the square wave blocks per half-cycle, $T_{core}$, in terms of time, t, where t ranges from $1-T_{core-1}$, where $V_{core}$ and $T_{core}$ are based on:

$$V_{core} = \frac{1}{N_{core} + 0.5}$$

$$T_{core} = 4N_{core};$$

and
determining $v_{ref}$ based on:

$$v_{ref} = V_1 \sin(2\pi ft) - V_{core}\left[\sum_{i=1,3,5,...}^{\frac{T_{core}}{2}-1} u(t - t_i) - u(t - t_{i+T_{core}}) + \sum_{j=2,4,6,...}^{\frac{T_{core}}{2}-2} u(t - t_{T_{core}-j}) - u(t - t_{2T_{core}-j})\right],$$

where u(t) is a magnitude of a control signal.

8. The method of claim 7, the hybrid modulation further comprising:
modulating $v_{ref}$ by two triangular carriers, Cr1 and Cr2; and
calculating a modulation index, m, based on:

$$m = \frac{v_{ref}}{Cr1,2 \text{ (peak)}},$$

where $0 \leq m \leq 1$.

* * * * *